May 8, 1945. B. C. COONS 2,375,350
FRUIT HANDLING MACHINE
Filed Aug. 26, 1940 10 Sheets-Sheet 2
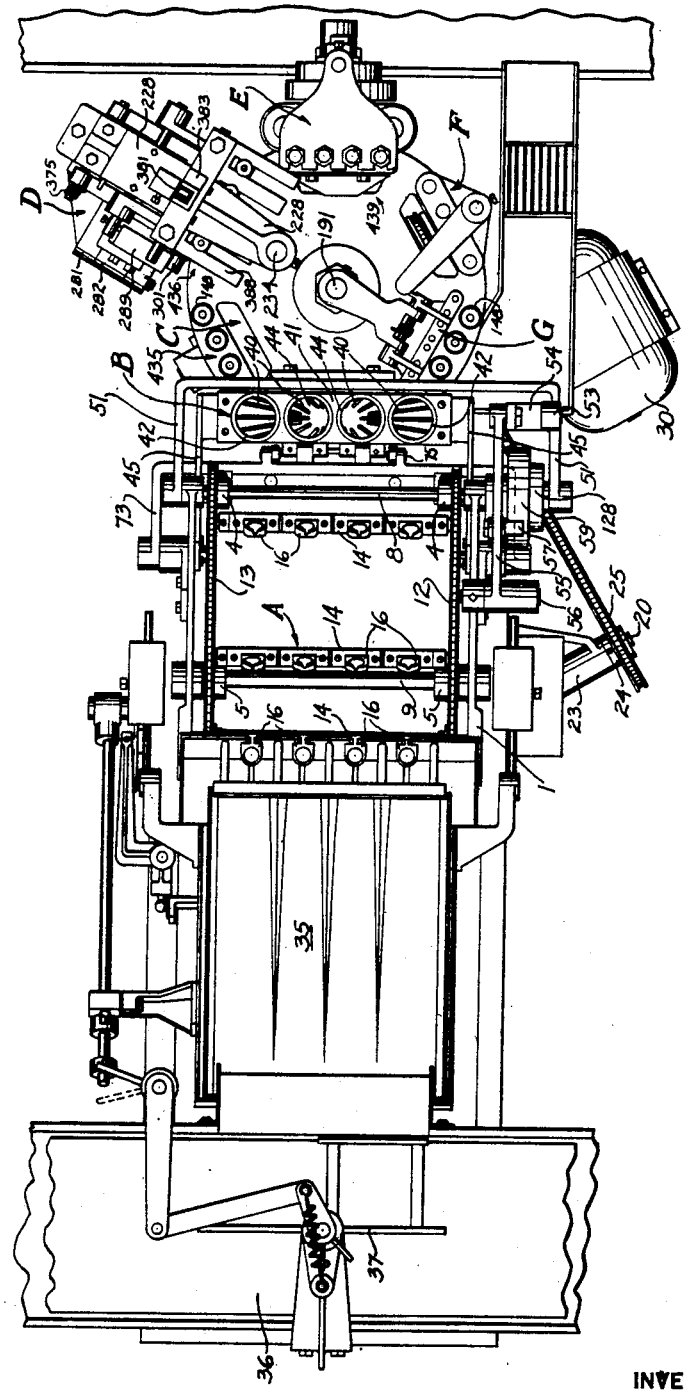
INVENTOR
BURTON C. COONS
BY Philip A. Minnis
ATTORNEY

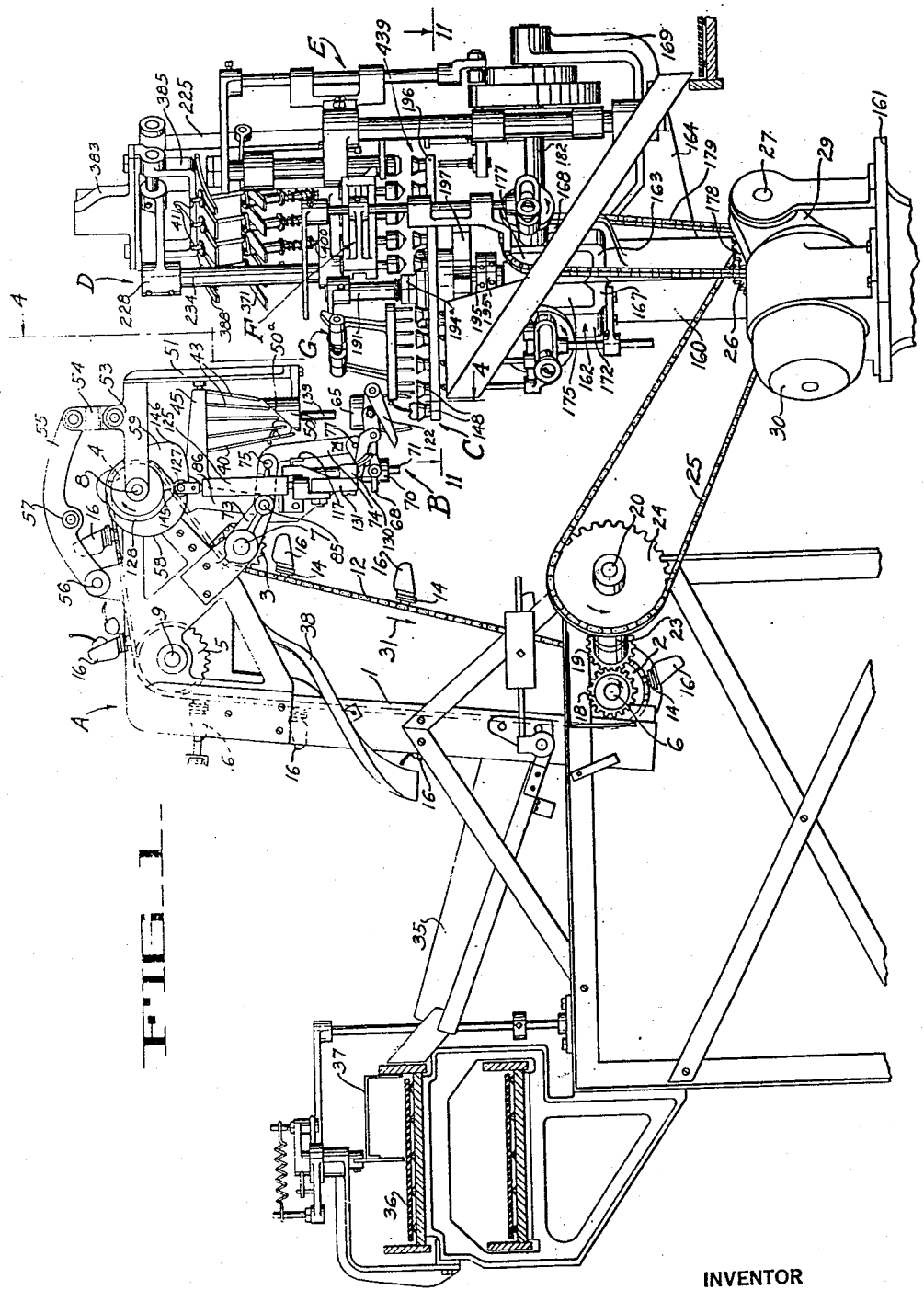

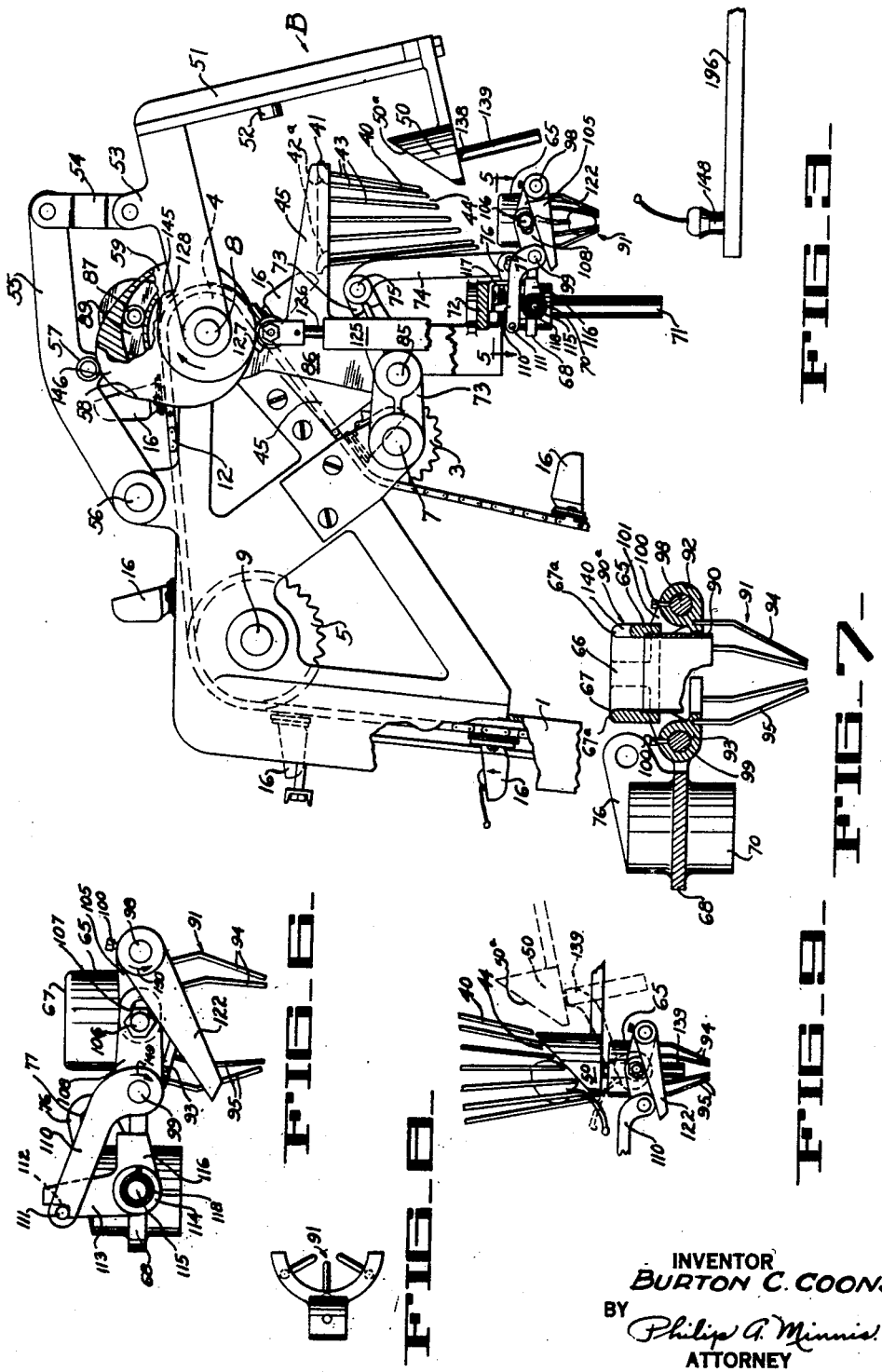

May 8, 1945.  B. C. COONS  2,375,350
FRUIT HANDLING MACHINE
Filed Aug. 26, 1940  10 Sheets-Sheet 4
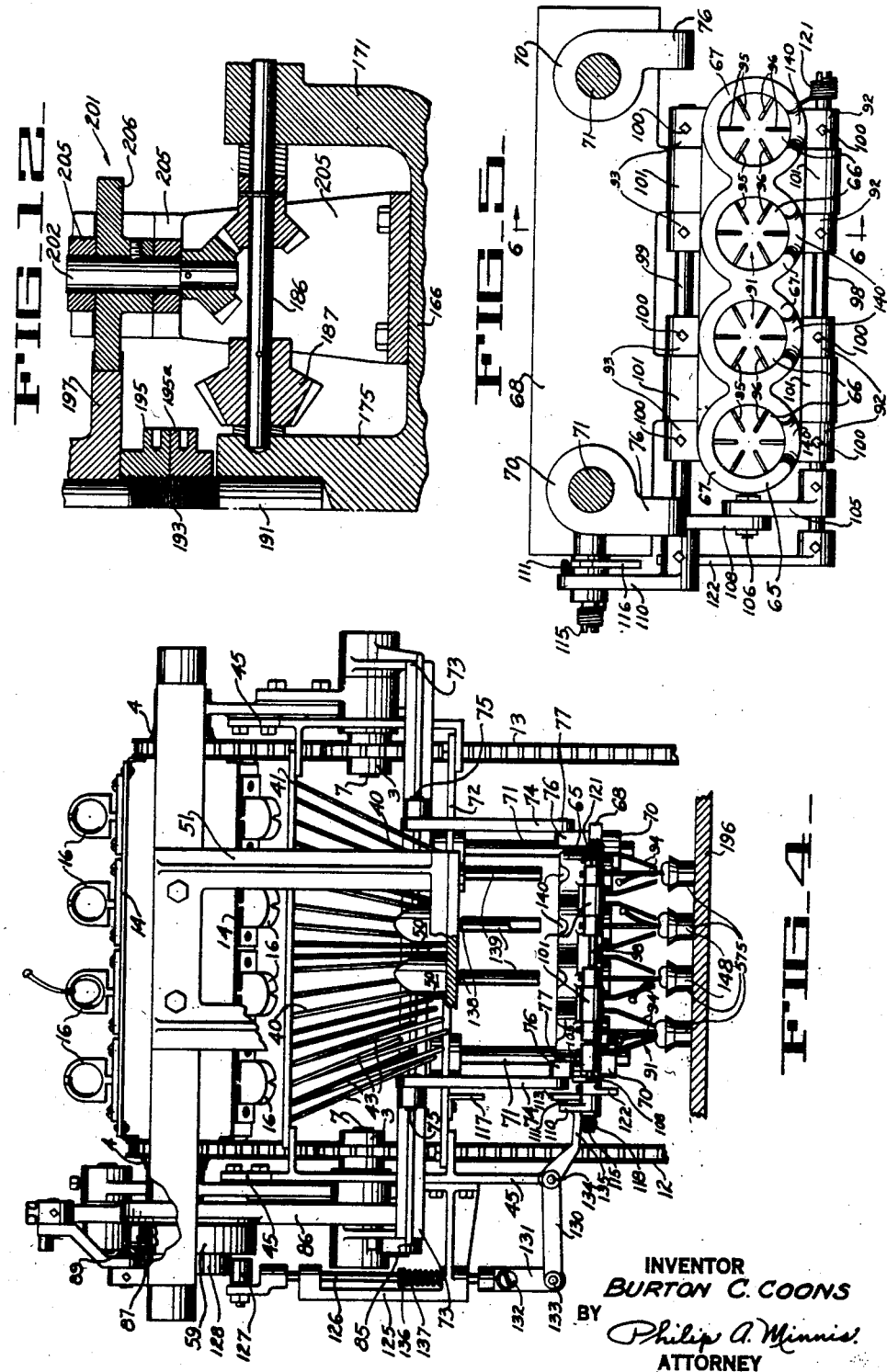
INVENTOR
BURTON C. COONS
BY Philip A. Minnis
ATTORNEY INVENTOR
BURTON C. COONS
BY Philip A. Minnis
ATTORNEY

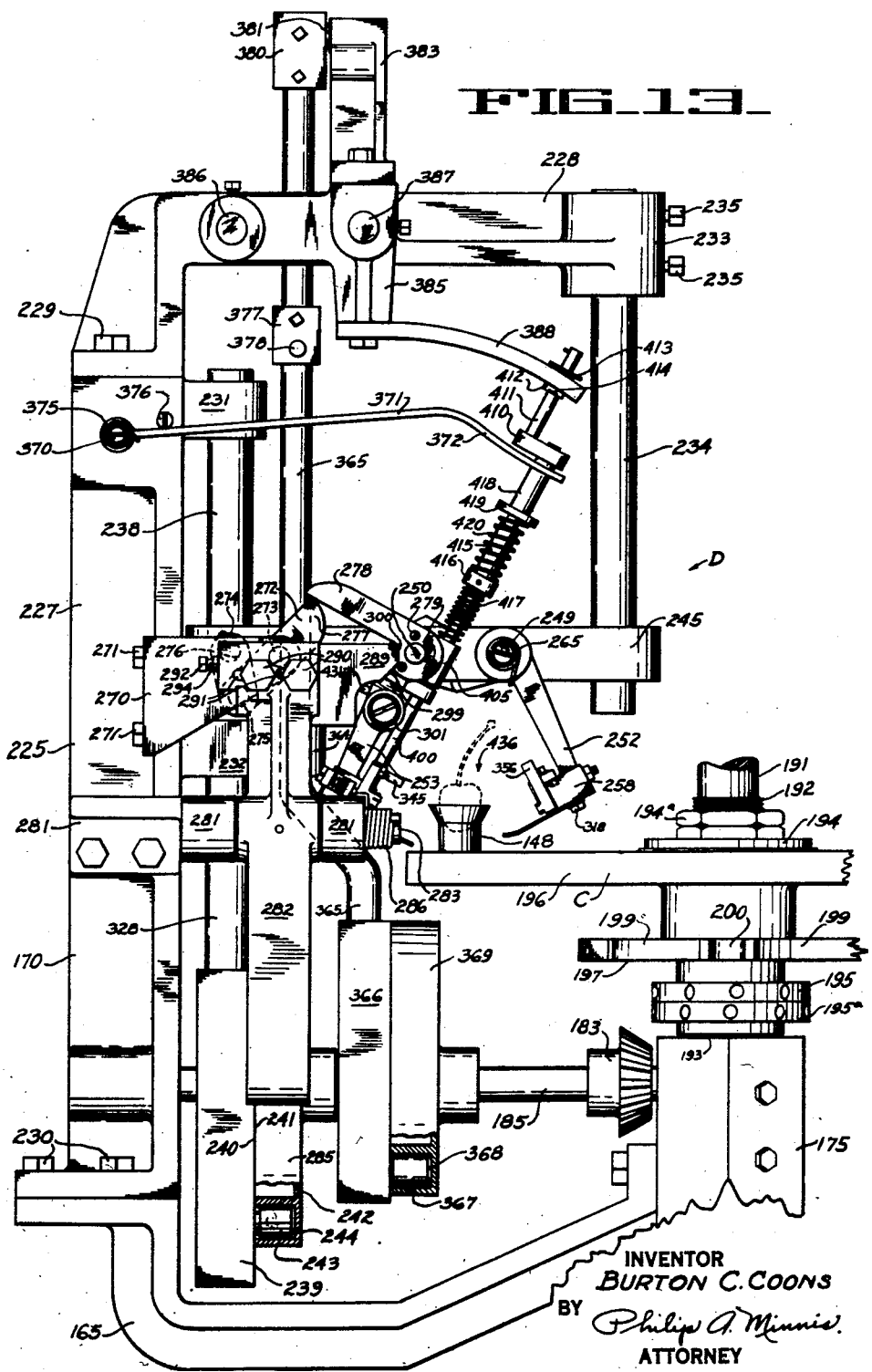

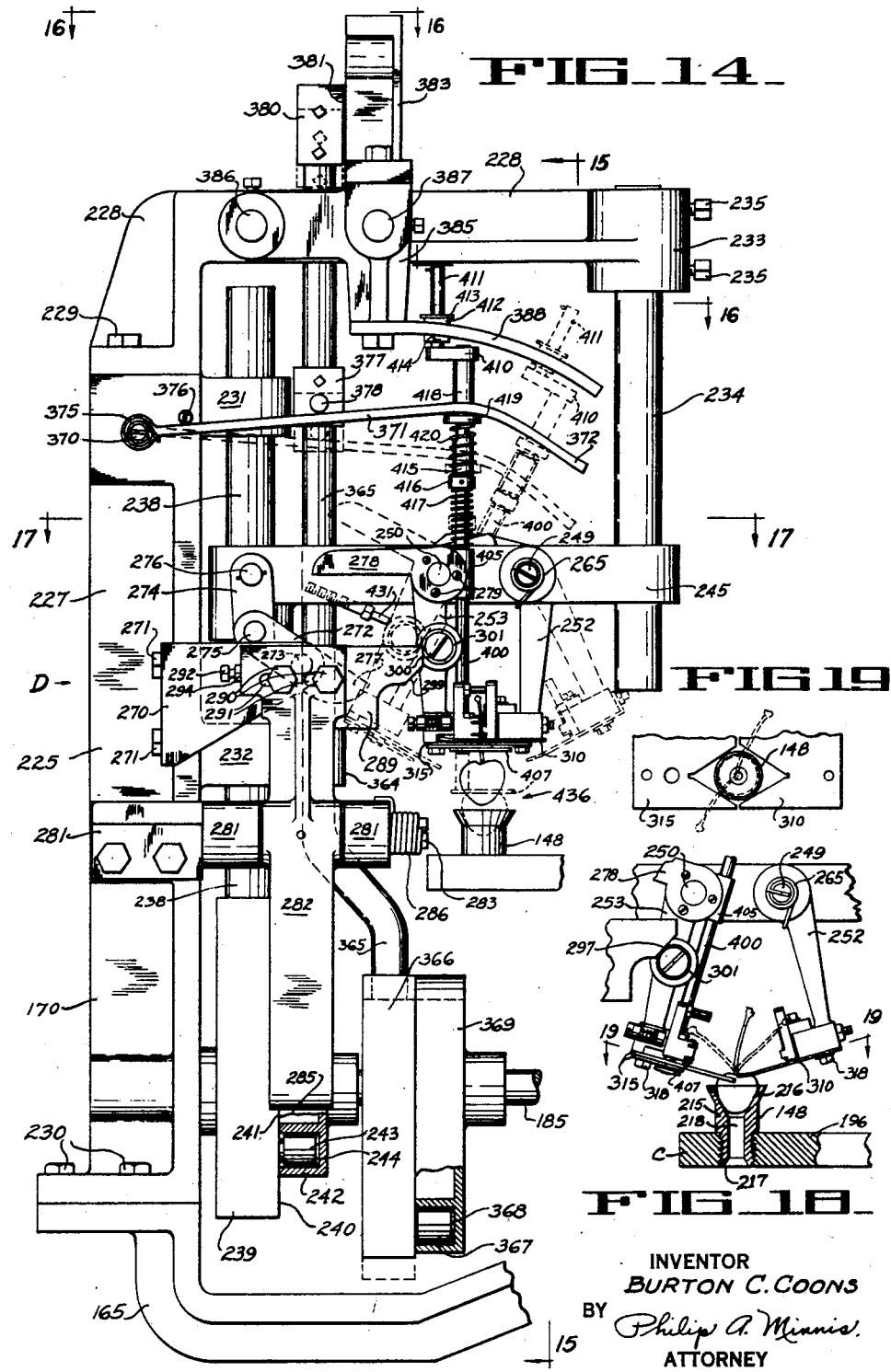

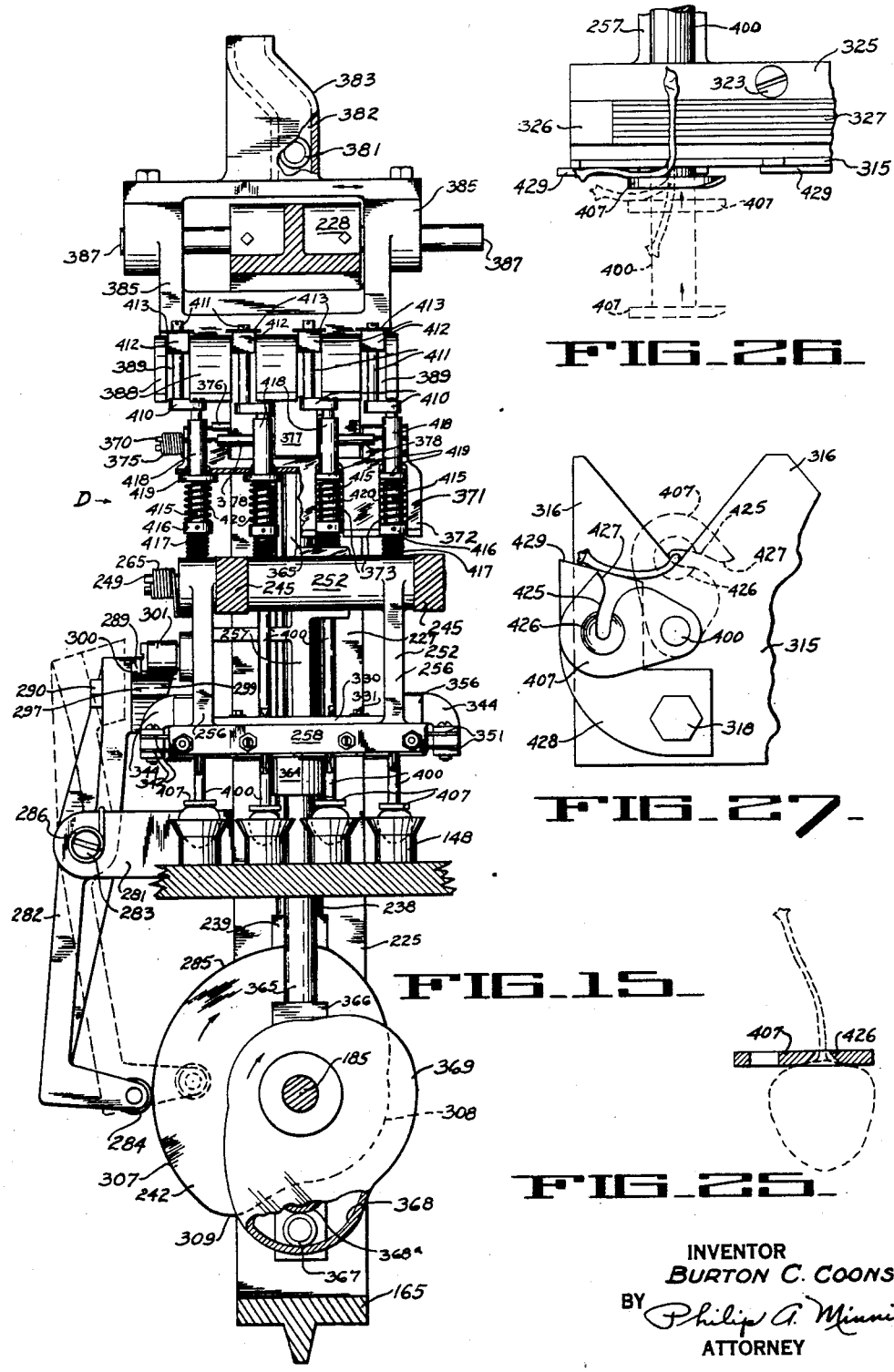

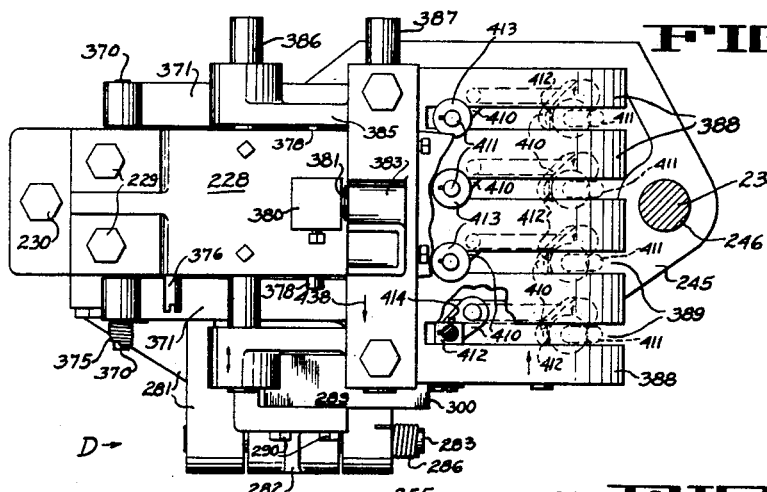
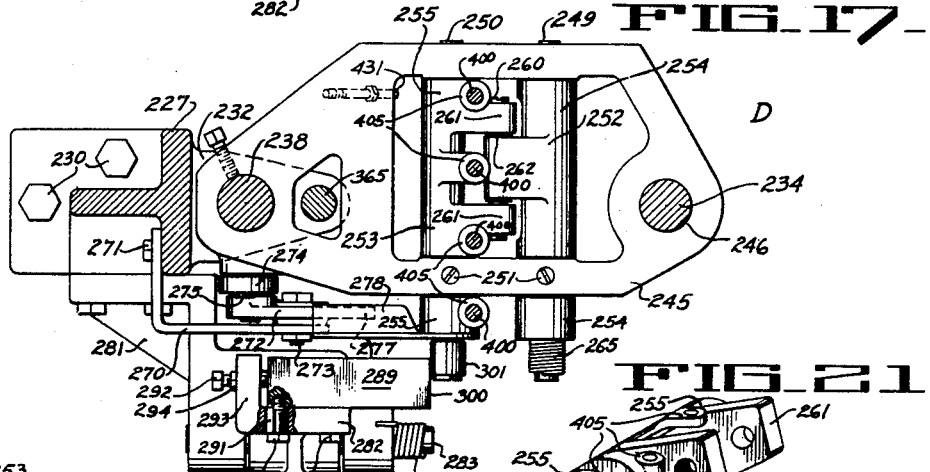
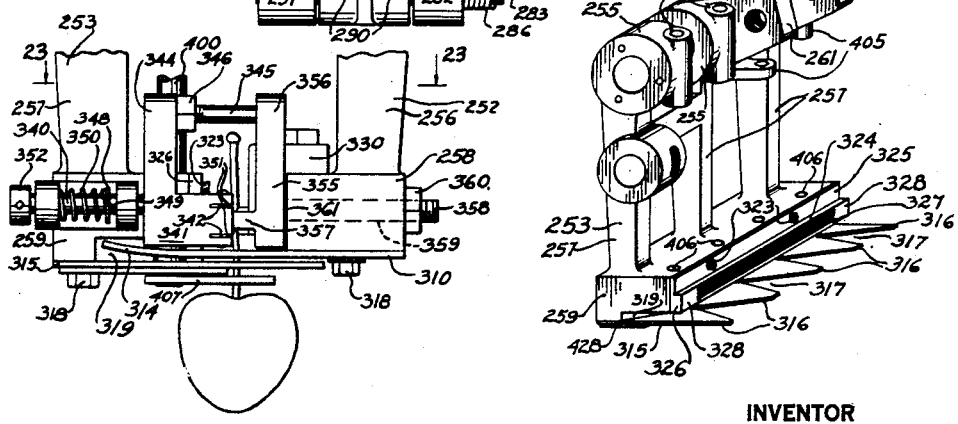

May 8, 1945. B. C. COONS 2,375,350
FRUIT HANDLING MACHINE
Filed Aug. 26, 1940 10 Sheets-Sheet 10

INVENTOR
BURTON C. COONS
BY Philip A. Minnis
ATTORNEY

Patented May 8, 1945

2,375,350

UNITED STATES PATENT OFFICE 2,375,350

FRUIT HANDLING MACHINE

Burton C. Coons, San Jose, Calif., assignor to Food Machinery Corporation, San Jose, Calif., a corporation of Delaware Application August 26, 1940, Serial No. 354,240

25 Claims. (Cl. 146—55)

The present invention relates to a machine for handling fruit such as cherries or the like and has as one of its objects to provide an automatic feed mechanism for delivering the fruit from a source of supply to fruit holding and supporting means in properly righted positions.

Another object is to provide an automatic feed mechanism for righting unstemmed fruits and for transferring the same in righted position to fruit holding and supporting means.

A further object is to provide a stemming mechanism for stemming the fruit presented thereto and for automatically centering the same during the stemming operation with respect to the fruit holding and supporting means.

Another object is to provide means for operating the feeding and stemming means in timed relation with respect to the operation of the fruit holding and supporting means.

Other and further objects and advantages of the present invention will become apparent from the following description taken in connection with the accompanying drawings, in which:

Fig. 1 is a side elevation of a fruit pitting machine having the present invention applied thereto.

Fig. 2 illustrates a plan view of the machine shown in Fig. 1.

Fig. 3 shows an enlarged side view of the automatic feed mechanism of the machine, together with a portion of the feed conveyor and the turret associated therewith; certain portions are broken away and others are shown in section.

Fig. 4 is a rear view of the automatic feed mechanism taken along lines 4—4 of Fig. 1; certain portions are broken away and others are shown in section.

Fig. 5 illustrates a plan view of the transfer cage unit of the automatic feed mechanism shown in Fig. 3 taken on lines 5—5 of Fig. 3.

Fig. 6 shows a side view of the transfer cage unit of Fig. 5, showing the transfer baskets thereof in locked and open position.

Fig. 7 is a section of the transfer cage unit taken along lines 6—6 in Fig. 5, showing the transfer baskets in closed position.

Fig. 8 illustrates a detail view of a portion of a transfer basket.

Fig. 9 is a fragmentary side view of the transfer cage and certain associated parts illustrating the operation thereof and showing primarily the manner in which a cherry is righted as it falls into the transfer cage.

Fig. 12 is an enlarged section of the turret index mechanism taken along lines 12—12 in Fig. 11.

Fig. 13 illustrates an enlarged side view of the stemming mechanism of the machine of the present invention, the stemming assemblies being shown in open position.

Fig. 14 is a side view of the stemming mechanism illustrating the stemming assemblies in closed position, certain portions being shown in section.

Fig. 15 is a section of Fig. 14 taken along lines 15—15 of the same, showing the stripping feet in their lowermost position.

Fig. 16 illustrates a plan view of the stemming mechanism shown in Fig. 14, certain portions being shown in section and others broken away.

Fig. 17 is a sectional view taken along the lines 17—17 in Fig. 14.

Fig. 18 is a side view of the stemming assemblies during their closing operation in conjunction with a fruit holding cup in cross section.

Fig. 19 is a plan view of cooperating centering plates and a fruit holding cup, the view being taken along lines 19—19 in Fig. 18.

Fig. 20 illustrates a side view of the lower portion of the stemming assemblies in closed position with the stem of a cherry held therebetween.

Figs. 21 and 22 are perspective views of the stemming assemblies.

Fig. 25 is a sectional detail view of a stripping foot.

Figs. 26 and 27 show a portion of one of the stemming assemblies illustrating certain operations of the stripping foot.

Figure 10:
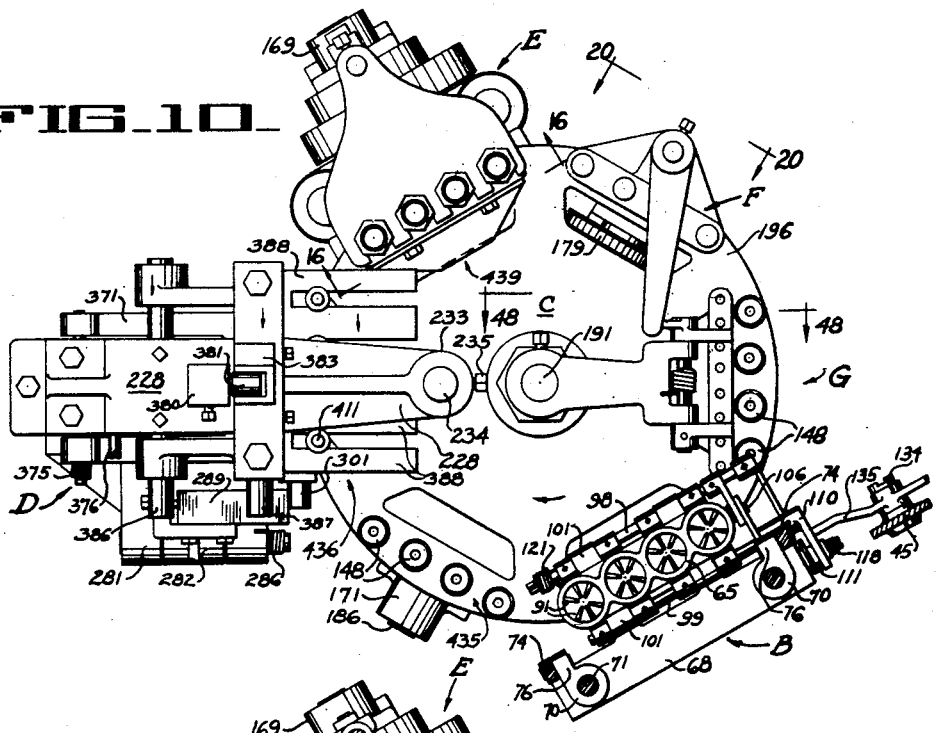
Fig. 10 shows a plan view of the turret, and the stemming, pitting, reshaping and ejecting mechanisms as well as a portion of the automatic feed mechanism associated therewith.

*General construction and operation of the machine*

The machine illustrated, as will be best seen from Figs. 1 and 2, comprises a feed conveyor A, an automatic feed mechanism B, a turret C, a stemming mechanism D, pitting mechanism E, reshaping mechanism F, and ejector mechanism G.

In the operation of the machine, the cherries are supplied by the conveyor A to the automatic feed mechanism B, which rights the cherries and feeds the same to the turret C. Thereupon the turret C presents the fruits received thereby to the stemming, pitting and reshaping devices D, E, and F, respectively, where the cherries are stemmed, pitted, and subsequently reshaped. Finally, the turret presents the finished fruits to the ejector mechanism which discharges the same from the machine.

With the foregoing description in mind, the construction and operation of the machine will now be specifically described.

Feed conveyor

The feed conveyor A, as will be seen from Figs. 1 and 2, comprises a frame structure 1 within which pairs of sprocket wheels 2, 3, 4 and 5 are rotatably mounted by means of shafts 6, 7, 8 and 9 respectively. Trained around these sprocket wheels are endless chains 12 and 13 provided with transverse bars 14, each carrying a series of fruit-receiving buckets 16.

The shaft 6 of the feed conveyor A is provided with a bevel gear 18 fixed thereto and cooperating with a bevel gear 19 fixed to a shaft 20 rotatably mounted within a bearing 23 supported by the conveyor frame 1 in any convenient manner. Keyed to the shaft 20 is a sprocket wheel 24 and a drive chain 25 is trained around the sprocket wheel 24 and a sprocket wheel 26. The sprocket wheel 26 is fixed to a shaft 27 of a speed reduction mechanism 29 of an electric motor 30, so that upon operation of the motor 30 the shaft 20 is rotated effecting rotation of the sprocket wheels 2 and causing travel of the conveyor chains 12 and 13 and the buckets 16 in the direction indicated by the arrow 31 in Fig. 1.

Mounted within the frame structure 1 adjacent the conveyor chains 12 and 13 is a hopper 35 for receiving the cherries to be pitted. The cherries may be supplied to the hopper 35 by means of a horizontal conveyor belt 36 and control gate 37, as illustrated in Fig. 1, or may be delivered to the hopper by means of a chute from a source of supply. If desired, the conveying means for delivering the cherries to the hopper 35 may be omitted and the cherries may be dumped directly from the boxes into the hopper above referred to.

During the travel of the conveyor chains 12 and 13 in the direction as indicated by the arrow 31 in Fig. 1, each series of buckets 16 passes through the hopper 35 and each bucket receives one cherry at a time and conveys the same to the automatic feed mechanism B into which the cherries are discharged from the buckets while the same pass around the sprocket wheels 4, as will be clearly seen from Figs. 1, 2 and 3.

In case two cherries are elevated by the fruit receiving cups 16 from the hopper 35, as shown in Fig. 1, the cherry not received within the bucket 16 will fall into the return chute 38 when the buckets travel around the sprocket wheels 5 and will be returned into the hopper 35.

In the drawings of the present application, four fruit receiving buckets 16 have been illustrated on each one of the transverse bars 14, and the automatic feed mechanism B, the turret C, and the stemming, pitting, reshaping and ejector mechanisms D, E, F and G, respectively, have also been illustrated for handling four cherries at a time. However, the capacity of the machine may be increased by increasing the fruit handling capacity of these devices, as will be obvious to those skilled in the art.

Any other feed conveyor structure may be employed in connection with the machine described herein, or the cherries may be fed manually into the automatic feed mechanism B, provided, however, that the cherries are supplied to the automatic feed mechanism in proper timed relation therewith and in such numbers at a time as required by the capacity of the machine.

Automatic feed mechanism

The purpose of the automatic feed mechanism B which receives the cherries from the feed conveyor A is to righten the cherries and to place the same in fruit holding cups of the turret C with the stems of the cherries in upward direction. The automatic feed mechanism operates in timed relation with the feed conveyor A and the turret C so that the transfer of the fruits to the fruit holding cups of the turret C is accomplished when the same are in a certain predetermined position.

The automatic feed mechanism B is supported on the frame structure 1 of the feed conveyor A and is operated by the feed conveyor mechanism; however, if desired, the automatic feed mechanism may be supported by a separate frame structure or other parts of the frame structure of the machine, and it may be independently operated by a separate drive mechanism associated with the motor 30, as will be obvious to those skilled in the art. In either case, a proper timing in the operation of the feed conveyor A, automatic feed mechanism B, and turret C may be easily obtained by means of speed reduction gears or the like because all of these devices are driven from a single source of motive power.

Referring now more specifically to the automatic feed mechanism B, as shown in Figs. 1 to 10 inclusive, it will be noted that same comprises a plurality of stationary chutes or baskets 40, one chute being provided for each receiving bucket 16 of a single transverse bar 14 of the feed conveyor A. These chutes 40 are mounted on a chute frame 41 provided with perforations 42 which form inlet openings for admitting the cherries into the chutes. The upper edges of the openings 42 are rounded, as best seen at 42a in Fig. 3, for purposes which will be explained later on. Each of these chutes is formed by a plurality of spaced, downwardly-converging wires or rods 43 of different lengths, which form at their lower ends a discharge opening 44. The chute frame 41 is supported by brackets 45 secured to the frame 1 of the feed conveyor A of the machine.

The discharge openings 44 of the baskets or chutes 40 are normally closed by control gates 50 having an upper inclined surface 50a. These control gates are pivotally mounted on the shaft 8 of the feed conveyor by means of a frame 51. Stops 52 on the frame 51 engageable with the chute frame 41 hold the control gates in proper chute-closing position.

Pivotally attached to a lug 53 on the frame 51 is a link 54 which in turn is pivotally secured to roller arm 55 pivoted to the frame 1 of the feed conveyor A at 56. The roller arm 55 carries a roller 57 cooperating with the outer cam surface 58 of a cam 59 keyed to the shaft 8.

Upon rotation of the shaft 8 and cam 59, effected by the travel of the conveyor chains 12 and 13, the roller 57 travels along the outer cam surface 58 and effects a raising and lowering of the roller arm 55. This movement is transferred to the frame 51 by the link 54 and causes a pivotal movement of the frame 51 around the shaft 8 moving the gate members 50 to open the discharge openings 44 of the chutes 40 and to subsequently close the same.

Mounted below the chutes 40 is a transfer cage 65 provided with a plurality of openings 66 (see Figs. 5 and 6), annular rims 67 with rounded upper edges 67a, and a transverse bar 68 comprising vertical sleeve bearings 70 slidably mounting the transfer cage 65 on guide rods 71 fixed to a transverse bar 72 carried by the brackets 45 (see Fig. 4). A yoke 73 pivotally mounted on the shafts 7 is connected with the transfer cage 65 by means of links 74 pivoted to the yoke at 75 and to lugs 76 of the transverse bar 68 at 77.

The yoke 73 (see Fig. 3) is pivotally connected at 85 to a yoke actuating arm 86 which straddles the shaft 8 and is provided with a roller 87 engaging a camway 89 of the cam 59 previously referred to. The camway 89 is eccentric to the shaft 8 and upon rotation of the same and cam 59 the yoke actuating arm 86 is oscillated, causing raising and lowering of the yoke 73 and the cage 65 supported thereby.

The cage 65 comprises further tubular members 90 secured to the lower portions of the rims 67 and in alignment with the openings 66 thereof. The rims 67 and tubular members 90 form righting members 90a for righting the fruits. Transfer baskets 91, each consisting of two sections 92 and 93 provided with downwardly converging fingers or rods 94 and 95, are fixed to transverse shafts 98 and 99 by means of set screws 100. These transverse shafts are rotatably supported within bearings 101 forming integral parts of the transfer cage 65, as will be best seen from Figs. 5 and 7.

Secured to shaft 98 is a link 105 provided with a pin 106 (see Figs. 5 and 6) engaging a slot 107 of a link 108 fixed to shaft 99 so that rotation of the shaft 99 in one direction causes a corresponding rotation of shaft 98 in an opposite direction. Fixed to shaft 99 is further a crank arm 110 provided with a pin 111 adapted to engage a notch 112 of the vertical arm 113 of a lock lever 114 pivotally mounted on the transverse bar 68 of the cage 65 by means of a stud shaft 115. A horizontal arm 116 of the lock lever 114 is adapted to engage a trip 117 (see Figs. 3 and 4) carried by the transverse bar 72, during the upward movement of the cage 65 and the lock lever 114 is thereby rocked, disengaging notch 112 from pin 111 and releasing the crank arm 110. A spring 118 (see Figs. 5 and 6) interposed between the stud and shaft 115 and lock lever 114 urges the latter toward locking position so that the crank arm 110 is immediately locked when the pin 111 is adjacent the notch 112.

A coil spring 121 interposed between the shaft 98 and the cage 65 urges the basket sections 92 and 93 of the transfer baskets 91 to closed position, as will be best seen from Fig. 5. A control arm 122 fixed in a predetermined position on shaft 98 is adapted to abut against crank arm 110 and determines the extent of closure of the transfer baskets 92 and 93 (see Fig. 9).

Attached to one of the brackets 45 (see Fig. 4) is a bearing bracket 125 within which an actuating rod 126 is slidably mounted. The upper end of this rod carries a roller 127 which engages a cam 128 fixed to shaft 8 adjacent the cam 59. The lower end of the actuating rod 126 is pivotally connected to a trip arm 130 by means of a link 131 and pivot pins 132 and 133, and the trip arm 130 in turn is pivotally secured to one of the brackets 45 at 134. The free end 135 of this trip arm 130 extends into the path of the crank arm 110 engaging the same from below thereof. The actuating rod 126 is further provided with a collar 136 fixed thereto, and interpositioned between this collar and the bearing bracket 125 is a coil spring 137 for maintaining the roller 127 in engagement with the cam 128.

The gate members 50 above referred to are provided with downwardly extending pins 138 which are concentric to the openings 66 of the transfer cage 65, when the same is in a position as shown in Fig. 1. The pins 138 carry flexible basket cleaners 139, which may be preferably made from a piece of rubber tube. These basket cleaners 139 are adapted to enter into the transfer cage and baskets and dislodge any fruit adhering to the same.

The rims 67 of the transfer cage 65 are provided with notches 140 (see Fig. 7) through which the rubber tubes 139 flip out (see Fig. 9) when the frame 51 and gate members 50 are moved to their outward position, as shown in dotted lines in Fig. 9 and in full lines in Fig. 3.

From Fig. 4 it will be noted that the chutes 40 are so positioned with respect to the feed conveyor A and transfer cage 65 that the cherries discharged from the buckets 16 into the chutes 40 are fed to the transfer cage 65 and fall through the tubular members 90 into the transfer baskets 91 which place the fruits into fruit holding cups of the turret C with the stems of the cherries in upward position.

When the cherries are discharged from the buckets 16 of the feed conveyor A into the chutes 40, the parts of the automatic feed mechanism B are in a position as shown in Fig. 1.

The cherries falling from the feed conveyor into the chute 40 will be righted during their free fall due to the air resistance upon the stems and consequent turning of the fruits. This righting of the fruits is assisted by the rounded edges 42a of the chute frame 41 adjacent the openings 42 against which the stems may strike while the fruits fall through the openings 42. The cherries fall, therefore, upon the control gates 50, which close the discharge openings of the chutes 40, with the stems pointing in substantially upward direction, and due to the inclined surface 50a of the gates, the cherries will roll downward the same and assume a position as shown in Fig. 1, or any other position, with the stems pointing either upwardly within the chutes or protruding laterally therefrom at various angles through the open spaces between the wires or rods 43.

Occasionally cherries will fall into the chutes 40 with the stems of the fruits pointing in a downward direction, and in such case the fruits will not be righted during their fall and the free ends of the stems will contact the gates 50 and slide downward the inclined surfaces 50a of the same and project laterally through the open spaces between the rods 43 of the chutes so that the cherries will assume a position as shown in Fig. 9.

During the above-described operation, i. e., while the cherries are positioned within the chutes 40, the transfer cage 65 is in its lowermost position, and the transfer baskets 92 and 93 are locked in open position.

During the continuous rotation of the shaft 8 of the feed conveyor A the cams 59 and 128 will be rotated in a direction as indicated by an arrow in Fig. 1, and the cam portion 145 of the cam 128 will disengage from the roller 127 of the actuating rod 126 and permit the same to move upwardly under the influence of spring 137, so that the free end 135 of the trip arm 130 disengages the crank arm 110.

Thereupon the inner cam track 89 of cam 59 which engages the roller 87 causes upward movement of the actuating arm 86, which in turn effects a pivotal movement of the yoke 73 around shaft 7 and raises the links 74 and the transfer cage unit 65 to its uppermost position, as shown in Figs. 3 and 9.

During the above described upward movement of the transfer cage 65 the basket cleaners 139 on the gate members 50 project into the transfer baskets 91 and dislodge any cherries which may adhere or stick to the transfer baskets, so that the same will fall downwardly therefrom.

Shortly before the transfer cage 65 reaches its uppermost position the horizontal portion 116 of the lock lever 114 strikes against the trip 117 and rocks the lock lever and disengages the notch 112 of the same from the pin 111 of the crank arm 110. This unlocks the transfer basket portions 92 and 93 and the same move immediately to closed position under the influence of spring 121. The extent of closing of the basket portions 92 and 93 is controlled by the control arm 122, which abuts against the crank arm 110, as will be seen from Fig. 3. The transfer cage 65 and the control gates 50 are now in a position as shown in full lines in Fig. 9.

When the parts are in the position as above described, the portion 146 of cam 59 engages the roller 57 (see Fig. 3) and raises the roller arm 55, which pivots around the pivot pin 56. Due to the fact that the roller arm 55 is pivotally connected to the frame 51 by means of the link 54, frame 51 pivots around shaft 8 and the gates 50 move outwardly away from the chutes 40 to the position as shown in Fig. 3. The cherries drop from the chutes 40 into the transfer cage 65 and are held within the transfer baskets 91, which at this time are in closed position.

While the control gates 50 move outwardly, as above described, the basket cleaners 139 flip outwardly from within the transfer cage 65 through the notches 140 in a manner as clearly illustrated in dotted lines in Fig. 9.

While the cherries fall downwardly from the chutes 40 into the transfer baskets 91, they pass through the openings 66, rims 67 and tubular members 90 of the righting members 90a associated therewith. The rims 67 engage the stems of the cherries and while the cherries fall through the tubular members 90 into the baskets 91, the stems of the fruits are righted into upwardly-pointing position.

In this connection, it may be mentioned that when the cherries are positioned within the chutes 40 upon the control gates 50 the stems of the fruits can never assume a straight downward position which would permit them to pass through the righting members 90a ahead of the fruits. Usually, the stems of the cherries will assume the positions as shown in full lines in Figs. 1 and 9, and when the cherries thereafter drop into the transfer baskets 91 the stems will always be righted by contact with the rims 67 and tubular members 90 to a substantially vertical position, as best seen from Fig. 3. If the cherries, however, become arranged with their stems pointing upwardly within the chutes 40 while they are held therein by the gate members 50, they will fall straight down into the transfer baskets 91 when the gate members move outwardly to a position as shown in Fig. 3, and in this case no additional righting of the cherries within the transfer cage 65 is necessary as the stems of the cherries are already in the desired position.

The angle of inclination of the inclined surfaces 50a of the control gates may be preferably between 45 and 60 degrees so as to assure the proper positioning of the fruits and to prevent any lateral movement or rotation of the fruits during opening of the control gates which would disalign the cherries with respect to the righting members 90a and tend to pull the stems into the opening 66 ahead of the fruits.

With the cherries positioned within the transfer baskets 91, as above described, cam 59, roller 87, and actuating arm 86 cause a downward movement of yoke 73, links 74, and the transfer cage 65, so as to position the transfer baskets 91 directly above and in close proximity to fruit holding cups 148 of the turret C. Thereupon, the portion 145 of cam 128 strikes the roller 127 and causes a downward movement of the actuating rod 126. This produces an upward movement of the free end 135 of the trip arm 130, which engages the crank arm 110 and moves the same upwardly to the position as shown in Fig. 6. The pin 111 of the crank arm 110 enters the slot 112 of the lock lever 114, and locks the crank arm 110 in the position as shown in Fig. 6.

The above described movement of the crank arm 110 from the position shown in Fig. 3 to the position shown in Fig. 6 causes rotation of the shaft 99 in the direction as shown by the arrow 149 in Fig. 6 and a corresponding rotation in an opposite direction, as indicated by an arrow 150 in Fig. 6, of the shaft 98 in view of the linkage connection 105 and 108 previously referred to. The transfer basket portions 92 and 93 will move to their open position, as shown in Fig. 6, and the cherries held between the fingers 94 and 95 of the transfer baskets 91 will drop into the fruit holding cups 148 of the turret C, as will be best seen from Fig. 4, with the stems of the cherries pointing in an upward direction.

Incident to the downward movement of the transfer cage 65 the portion 146 of cam 59 disengages from the roller 57, and frame 51, due to its own gravity, returns to its original position as shown in Fig. 1, positioning the gate members 50 below the discharge openings of the chutes 40. Thereupon, the next row of cherries are now discharged into the chutes 40 by the succeeding series of buckets 16 of the feed conveyor A and the cycle of operation of the automatic feed mechanism B repeats during the continuous operation of the machine in the same manner as above described.

*Turret frame structure and drive*

The frame structure of the turret C which also supports the stemming, pitting, reshaping and ejector mechanisms D, E, F and G, respectively, comprises a frame or standard 160 provided with a bracket 161 upon which the motor 30 previously referred to is mounted. The upper portion of the base 160 is formed into a spider structure generally indicated at 162, which comprises a plurality of radially extending spider arms 163, 164, 165, 166 and 167, provided with vertically extending portions 168, 169, 170, 171 and 172, respectively. The frame portion 160 comprises further a hexagonal central body portion 175, as will be best seen from Figs. 1 and 11.

Rotatably mounted within the vertical portion 168 of the spider arm 163 and within the hexagonal portion 175 is a drive shaft 176 provided with a sprocket wheel 177 keyed thereto. Trained around this sprocket wheel 177 and a sprocket wheel 178 secured to the shaft 27 of the gear reduction drive 29 of the motor 30 is a drive chain 179 for driving the drive shaft 176 upon operation of the motor 30. Secured to the drive shaft 176 is a bevel gear 180 which intermeshes with a bevel gear 181 fixed to a shaft 182 rotatably mounted within the hexagonal body portion 175 and the vertical portion 169 of the spider arm 164. The bevel gear 181 is in engagement with a bevel gear 183 keyed to a shaft 185 rotatably mounted within the hexagonal body portion and the vertically extending portion 170 of the spider arm 165. In a similar manner, an index drive shaft 186 (see also Fig. 12) is rotatably mounted within the hexagonal body portion 175 and the vertically extending portion 171 of the spider arm 166. Fixed to the shaft 186 is a bevel gear 187 which intermeshes with the bevel gear 183 previously mentioned.

Figure 11:
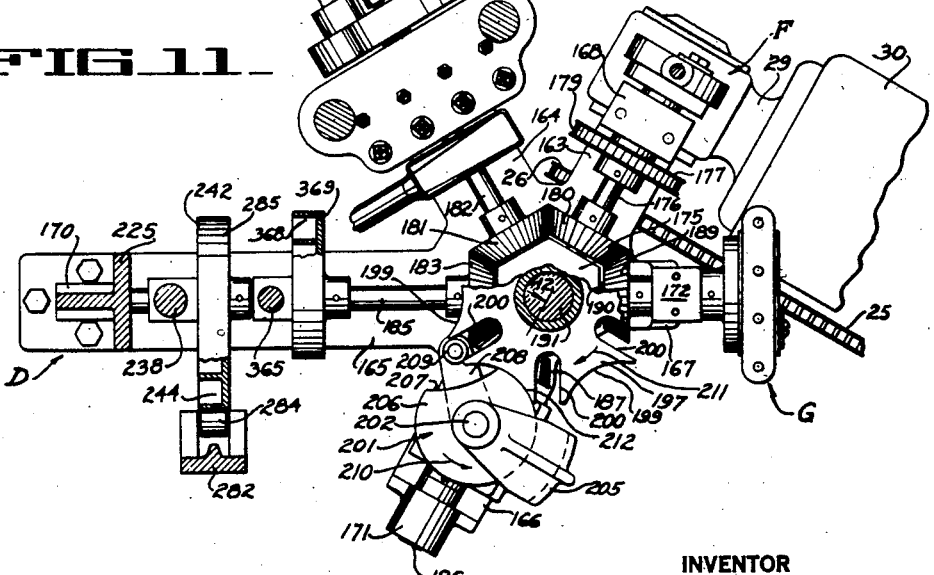
Fig. 11 is an enlarged section taken along lines 11—11 in Fig. 1 showing the drive mechanism of the machine, certain portions being broken away.

The bevel gear 180 is also in operative engagement with a bevel gear 189 mounted on a shaft 190 rotatably arranged within the vertical portion 172 of the spider arm 167 and the hexagonal body portion 175, as will be best seen from Fig. 11.

The drive shaft 176 is arranged to receive a crank disc for driving the reshaper F; the shaft 182 to carry a set of rotary cams for operating the pitting mechanism E; the shaft 185 to carry a set of cams for operating the stemming mechanism D; the shaft 186 having a bevel gear keyed thereto for driving the turret indexing mechanism and the shaft 190 carries a crank disc for operating the ejector mechanism G.

From the above, it will therefore be noted that upon operation of the motor 30, shaft 176 will be rotated and in turn will cause a corresponding rotation of shafts 182, 185, 186, and 190, due to the bevel gearing above described, to effect the operation of the stemming, pitting, reshaping and ejector mechanisms and the turret index mechanism.

*Turret and index mechanism*

The upper end of the hexagonal body portion 175 of the turret frame 160 is provided with a stationary vertical stud shaft 191 having threaded portions 192 and 193 (see Figs. 1, 12 and 13). Threadedly secured to the shaft portion 192 are a retaining flange 194 and a lock nut 194a, while an adjusting nut 195 and a lock nut 195a are threadedly secured to the shaft portion 193. Freely rotatable on the stud shaft 191 intermediate the retaining flange 194 and adjusting nut 195 and supported by the latter is the turret C, which consists of a table 196 provided with a plurality of fruit holding members 148, previously mentioned, and an index plate 197. This index plate 197 may be integral with the table 196 or may be a separate part secured to the table in any convenient manner for rotation therewith.

From the above it will be seen that the table 196, the fruit holding means 148 and index plate 197 are adjustable in vertical directions on the stud shaft 191 by manipulation of the retaining flange 194 and adjusting nut 195 after loosening of the lock nuts 194a and 195a, so that the fruit holding members 148 may be properly adjusted with respect to the automatic feed mechanism B and the stemming, pitting and reshaping mechanisms D, E and F respectively.

The fruit holding cups 148 are arranged in rows of four to provide a plurality of series or groups of fruit holding cups 575, and each series or group is angularly positioned with respect to each other, forming chords of the circle defined by the table 196.

The index plate 197 comprises arcuate faces 199 and elongated radially extending slots 200, as will be best seen from Fig. 11.

The index mechanism generally indicated at 201 (see Figs. 11 and 12) consists of a vertical shaft 202 which is rotatably mounted within a bracket 205 secured to the spider arm 166 and provided near its upper end with a locking plate 206, comprising a cut-out portion 207, and an index arm 208 carrying a roller 209.

During the rotation of the shaft 202 and index arm 208 in the direction of the arrow 210 in Fig. 11, the roller 209 enters one of the elongated slots 200 of the index plate 197 and causes rotation of the latter in the direction of the arrow 211 until the arcuate face 199 following such slot is in engagement with the locking plate 206 and locked by the peripheral face 212 of the same against further rotation.

At this time, the parts of the index mechanism are in a position as shown in Fig. 11, and the roller 209 now leaves the respective slot 200 and the index plate 197 remains in locked position until the roller 209 enters the next slot 200 of the index plate 197 and causes further rotation of the same. It will be observed from Fig. 11 that upon entry of the roller 209 into one of the elongated slots 200 of the index plate 197 the cut-out portion 207 of the locking plate 206 will be in such a position with respect to the index plate 197 that the latter may rotate without interfering with the locking plate 206.

The elongated slots 200 are disposed at angles of 60° with respect to each other corresponding to the angular position of the rows or series of fruit receiving members 148, and the arcuate faces 199 of the index plate 197 are disposed intermediate the elongated slots 200, as will be clearly seen from Fig. 11.

The index mechanism 201 above described will therefore effect an intermittent rotation of the turret C, so that a corresponding advancement of the series of fruit holding members 148 from the automatic feed mechanism B to the stemming mechanism D, pitting mechanism E, reshaping mechanism F, and ejector mechanism G is obtained.

The structure of the fruit holding members 148 is clearly disclosed in Fig. 18. These fruit holding members consist of a body portion 215 having a cup-like conical fruit-receiving portion 216 and a threaded portion 217 with which the same are threadedly secured to the table 196 of the turret C.

Each of these fruit holding members or cups 148 is further provided with a central bore 218 which extends vertically through the body portion thereof and communicates with the conical fruit receiving portion 216.

The conical interior or dished portion 216 of the fruit holding members 148 is sufficiently large to accommodate cherries of various sizes and is of such configuration that the cherries placed therein in centered position will remain in such position during the rotation of the table 196. In other words, the interior surface 216 exerts a slight wedging action upon the fruit so as to hold the same in proper position.

Stemming mechanism

The stemming mechanism D which is illustrated in Figs. 1, 2, 10, 11 and 13 to 28 inclusive comprises a frame structure 225 which forms the vertically extending portion 170 of the spider arm 165 previously referred to. This frame structure 225 consists of an upright bracket 227 and an L-shaped guide bracket 228. These brackets are secured together by means of screws 229 in a manner as best seen from Figs. 13 and 14, and bracket 227 is attached by screws 230 to the spider arm 165 which supports the same.

The bracket 227 is provided with spaced vertical bearings 231 and 232 and the guide bracket 228 comprises a hub 233 within which a stationary guide shaft 234 is fixed by means of set screws 235. The guide shaft 234 depends from the guide bracket 228 in a vertical direction toward the turret C and parallel to the bearings 231 and 232.

Slidably mounted within the bearings 231 and 232 is a vertical shaft 238 provided with a guide member 239 having a guide face 240 engaging a guide face 241 of a rotary cam 242 keyed to the shaft 185. The guide member 239 carries a roller 243 which extends into a camway 244 of the rotary cam 242.

Fixed to the shaft 238 intermediate the bearings 231 and 232 is a supporting bracket 245 which is slidably mounted on the guide shaft 234 by means of a bearing 246 as will be clearly seen from Fig. 17.

The supporting bracket 245 is further provided with pivot pins 249 and 250 which extend transversely through the same and parallel with respect to each other. Set screws 251 (see Fig. 17) hold the pivot pins in fixed position on the supporting bracket 245. Depending from the supporting bracket 245 are opposing stemming assemblies 252 and 253 which comprise bearing portions 254 and 255, arms 256 and 257 and transverse jaws 258 and 259, respectively. These stemming assemblies are pivotally secured to the supporting bracket 245 by the pivot pins 249 and 250 thereof which extend through the bearing portions 254 and 255, respectively.

The stemming assemblies are operatively connected by a pin 260 secured within ears 261 of the stemming assembly 253 and a block 262 journaled upon pin 260 and slidably positioned in a slot 263 of an arm portion 264 of the stemming assembly 252 (see Figs. 17, 21, 22 and 24) so that upon movement of one of the stemming assemblies a corresponding movement of the other of said stemming assemblies is obtained. A coil spring 265 interposed between the pivot pin 249 and the stemming assembly 252 urges the stemming assemblies to open position as shown in Fig. 13.

To prevent damage to the stemming assemblies 252 and 253 due to failure or breakage of the coil spring 265 a positive opening mechanism is provided. This opening mechanism, as clearly shown in Figs. 13 and 17, consists of a bracket 270 secured to the bracket 227 by screws 271 and a tripping arm 272 pivotally mounted on the bracket 270 by a pivot pin 273. One end of the tripping arm 272 is pivotally secured to a link 274 by means of a pivot pin 275, and the link 274 in turn is pivotally mounted on a pin 276 fixed to the supporting bracket 245. The free end 277 of the tripping arm 272 is adapted to engage an actuating arm 278 fixed to one of the bearing portions 255 of the stemming assembly 253 by means of screws 279.

Secured to the bracket 227 is a bracket structure 281 on which a locking arm 282 is pivotally mounted by means of a pivot pin 283 fixed thereto (see Figs. 13 to 15 and 17). The locking arm 282 is provided at its lower end with a roller 284 adapted to engage an outer peripheral cam surface 285 of the rotary cam 242. A coil spring 286 interposed between the bracket 281 and the pivot pin 283, which is freely rotatable in the bracket 281, maintains the roller in operative engagement with the cam surface 285.

A locking block 289, as best seen from Figs. 13, 14, 15 and 17, is secured to the upper end of the locking arm 282 by means of cap screws 290 which extend through elongated slots 291 in the locking arm so that the locking block can be adjusted with respect thereto. An adjusting screw 292, extending through a portion 293 of the locking arm 282 which is at a right angle to the remaining locking arm structure (see Fig. 17), engages the locking block 289 and permits an accurate adjustment thereof with respect to the locking arm 282 after the cap screws 290 have been somewhat loosened. Upon completion of the adjustment of the locking block, as above stated, the same is securely locked in position by tightening the cap screws 290 and by locking the adjusting screw 292 in position by a lock nut 294.

The locking block 289 is provided with a cammed end 297 having an inclined cam surface 299 and a straight surface 300. A roller 301 on the stemming assembly 253 is adapted to cooperate with the cammed end of the locking block to effect an operation of the stemming assemblies in a manner specifically described later on.

The camway 244 of cam 242 is of such configuration that upon rotation of the shaft 185 and cam 242 in the direction as shown by an arrow in Fig. 15, the vertical shaft 238, the supporting bracket 245, and the stemming assemblies 252 and 253 will be raised and lowered. The outer peripheral face 285 of the rotary cam 242 comprises a hill portion 307 and a valley portion 308. When the stemming assemblies are in their lowermost and open position, as shown in Fig. 13, the hill portion 307 of cam 242 engages the roller 284 and rocks the locking arm 282 around its pivot 283 to the full line position as shown in Fig. 15 and the locking block 289 is shifted into the path of the roller 301 of the stemming assembly 253.

During subsequent upward movement of the vertical shaft 238, supporting bracket 245 and the stemming assemblies 252 and 253, the roller 301 engages the cam surface 299 and finally the straight cam surface 300 of the locking block 289 and effects a closing of the stemming assemblies.

Fig. 14 shows the stemming assemblies in their uppermost and closed position. The straight cam surface 300 is in engagement with the roller 301 and the stemming assemblies remain in closed position until the hill portion 307 suddenly disengages from the roller 284 at 309 during rotation of the cam 242, and the locking arm 282, under the influence of spring 286, rocks to the dotted line position as shown in Fig. 15 so that the roller 284 engages the valley portion 308 of the cam 242. This last mentioned movement of the locking arm 282 disengages the locking block 289 from the roller 301 and the stemming assemblies 252 and 253 open under the action of spring 265 in a manner as explained hereinbefore. Thereupon roller 243 and camway 244 move the shaft 238 and supporting bracket 245 and the open stemming assemblies 252 and 253 downwardly to the position shown in Fig. 13 and the cycle of operation of the vertical shaft 238, supporting bracket 245 and the stemming assemblies repeats during the continuous operation of the machine in the same manner as above described.

Attached to the lower side of jaw 258 of the stemming assembly 252 (see Figs. 20, 22 and 24) is a centering plate 310 provided with centering fingers 312 and V-shaped slots 313. The ends 314 of the centering fingers are slightly curved in an upward direction, as will be best seen from Fig. 20. In a similar manner, the jaw 259 of the stemming assembly 253, as best seen from Figs. 20 and 21, is provided with a centering plate 315, which comprises centering fingers 316 and V slots 317. The centering plates 310 and 315 are removably secured to the jaws 258 and 259, respectively, by means of screws 318 so that they may be readily replaced when they are worn out. The centering plates 310 and 315 are so positioned with respect to each other that the centering fingers 312 and 316 and the V slots 313 and 317 are in alignment with respect to each other.

The jaw 259 of the stemming assembly 253 extends somewhat lower than the jaw 258 of the stemming assembly 252, so that the centering plate 315 will slide below the centering plate 310 when the stemming assemblies close. The curved ends 314 permit a close spacing of the centering plates without interference of the centering fingers during the closing action. A plurality of recesses 319 of V-shaped configuration in the jaw 259 receive the curved ends of the plates 310 when the stemming assemblies are in closed position (see Fig. 20).

Connected to the jaw 259 of the stemming assembly 253 by screws 323 is a stem gripping member 324 which includes a flange 325 and a forwardly extending projection 326 comprising a corrugated gripping face 327 and abutment faces 328. The jaw 258 is provided with a block 330 adjustably secured to the same by lock screws 331, which extend through slots 330a in the block 330, and adjusting screws 331a threaded within the jaw 258 and engaging the inner face of the block 330. Lock nuts 331b are provided to lock the adjusting screws in adjusted position. The block 330 carries a plurality of gripping members 332, projecting therefrom and comprising corrugated gripping faces 333. The gripping members 332 may be integral parts of the block 330 or may be separate members adjustably mounted therein in any convenient manner. The above adjustable mounting of the block 330 permits adjustment and alignment of the gripping faces 333 with respect to the gripping face 327 in an obvious manner.

The corrugated gripping faces 333 are so positioned that they are in alignment with the corrugated gripping face 327 when the stemming assemblies are in closed position. The corrugations of the gripping faces 327 and 333 extend in horizontal directions and the hill and valley portions of the same are parallel with respect to each other. The hill portions of the gripping faces 333 are opposite the valley portions of the gripping face 327 when the stemming assemblies are in closed position. However, the corrugations of the gripping faces 327 and 333 do not extend entirely to the lower edges of these faces, as clearly shown at 334 in Fig. 24, so that the stems of the cherries gripped therebetween are not bent at the points where they protrude from the gripping faces (see Fig. 20). This prevents breakage of the stems at these points during the stemming operation.

Figure 23:
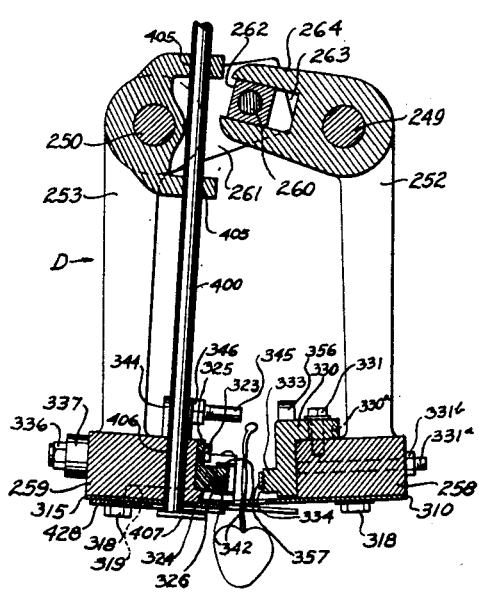
Fig. 23 is a section of the stemming assemblies taken along lines 23—23 of Fig. 20.

Secured to the sides of the jaw 259 of the stemming assembly 253 by means of screws 336 are brackets 337 comprising bearing portions 338 and 339 within which shafts 340 are slidably mounted (see Fig. 23). Fixed to the ends of the shafts 340 adjacent the bearing portions 338 are blocks 341 which carry strike-off bars 342 extending transversely of the jaw 259 above and below the forward projection 326 of the stem gripping member 324. The width of the bars 342 is less than the width of projection 326 of the stem gripping member 324. The blocks 341 include upwardly extending ears 344 which carry stop pins 345. These stop pins are threadedly secured to the ears 344 and are therefore adjustable with respect thereto. Lock nuts 346 are utilized to hold the stop pins in adjusted positions.

Interposed between the bearing portions 339 and a washer 348 secured to the shafts 340 in a predetermined position by pins 349 are coil springs 350 which urge the shafts 340, blocks 341, and strike-off bars 342 in a forward direction so that the front edges 351 of these bars will project beyond the corrugated face 327 of the stem gripping member 324. Retaining collars 352 adjustably secured to the shafts 340 limit the forward movement of the strike-off bars 342.

Positioned on the jaw 258 adjacent the block 330 of the stemming assembly 252 are stop members 355 provided with vertically and horizontally extending stop lugs 356 and 357. Each of these stop members comprises further a rod 358 which is fixed thereto in any convenient manner. The rods 358 extend through holes 359 of the jaw 258 and their free ends are threaded and provided with a nut 360 for firmly securing the stop members to the jaw 258 in a manner as best seen from Figs. 20 and 23. The stop members 355 are adjustable relative to the jaw 258 and the adjustment is accomplished by placing shims 361 between the jaw and the stop member (see Fig. 20). This adjustment permits an accurate spacing of the corrugated faces 327 and 333 so that they will not touch each other when the stemming assemblies are closed and a pinching off of the stems of the cherries engaged thereby is prevented.

When the stemming assemblies 252 and 253 move to closed position (see Figs. 20 and 24) the stop lugs 356 engage the stop pins 345 and shift the blocks 341 and strike-off bars 342 in a backward direction, as indicated by arrows 362 in Fig. 23, against the tension of the springs 350. This retracts the front edges 351 of the strike-off bars 342 behind the gripping face 327 of the stem gripping member 324. Finally the stop lugs 357 engage the abutment faces 328 of the stem gripping member 324 and hold the corrugated gripping faces 327 and 333 of the stem gripping members 324 and 332 in slightly spaced relation when the stemming assemblies arrive at their closed position, as shown in Fig. 20.

Figure 28:
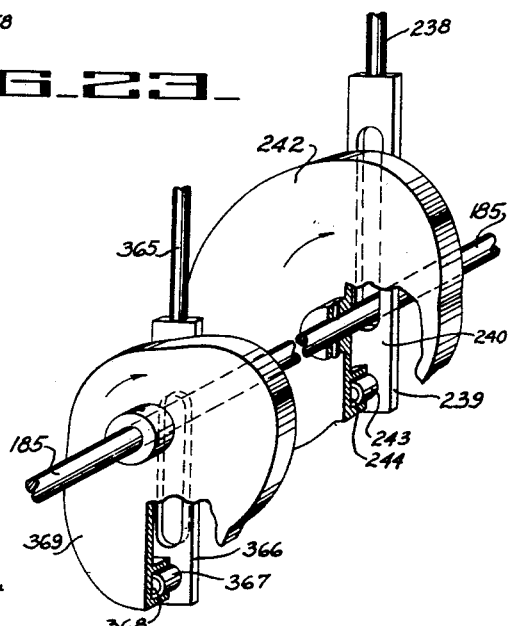
Fig. 28 is a perspective view of the operating cams of the stemming mechanism, certain portions being broken away and others are shown in section.

Slidably mounted within the guide bracket 228 and a vertical bearing 364, which is integral with the bearing 232 on the bracket 227 (see Fig. 13) is a vertical shaft 365 provided with a guide member 366 which straddles shaft 185 (see Fig. 28). This guide member carries a roller 367 engaging a camway 368 of a rotary cam 369 keyed to shaft 185.

Pivoted on a pin 370 secured to the bracket 227 is a stripping arm 371 having a curved end 372 and a plurality of spaced parallel slots 373 (see Fig. 15). Interposed between the pin 370 and stripping arm 371 is a coil spring 375 which normally holds the stripping arm 371 in its upper position in engagement with a stop pin 376 on the bracket 227.

Adjustably secured to the shaft 365 is a block 377 provided with a pin 378 adapted to engage the stripping arm 371 and to force the same downwardly upon downward movement of the shaft 365. Another block 380 fixed to the upper end of shaft 365 above the guide bracket 228 carries a roller 381 adapted to travel in a cam race 382 of a U-shaped cam bracket 383 (see Figs. 13, 14, and 15). This cam bracket is attached to a stripping shaft actuating bracket 385 which is slidably mounted for reciprocation in transverse directions with respect to the guide bracket 228 by means of guide pins 386 and 387 fixed on the bracket 228.

The actuating bracket 385 carries an arcuate plate 388 provided with a plurality of spaced parallel slots 389 which extend substantially over the full length of the plate and are open at the free end thereof (see Fig. 15).

A plurality of stripping shafts 400 are slidably and rotatably arranged within vertical bearings 405 on the bearing portions 255 of the stemming assembly 253 and extend with their lower ends through bearings 406 in the jaw 259 and centering plate 315. The lower end of each stripping shaft 400 carries a stripping foot 407 fixed thereto, as will be clearly seen from Figs. 15, 20, 24, 26 and 27.

The upper ends of the stripping shafts 400 extend through the slots 373 of the stripping arm 371 and carry crank arms 410 fixed thereto and provided with crank pins 411 which in turn extend through guide blocks 412 within which they are rotatably and slidably received.

The guide blocks 412 are positioned within the slots 389 of the arcuate plate 388 and are retained in proper engagement with the latter by means of flanges 413 and 414.

Fixed to the stripping shafts 400 are sleeves 415 having flanges 416 and positioned on the stripping shafts intermediate the flanges 416 and the upper ends of the bearings 405 of the stemming assembly 253 are coil springs 417. Freely movable on the shafts 400 and spaced with respect to the sleeves 415 are sleeves 418 provided with flanges 419. The sleeves 418 extend through the slots 373 of the stripping arm 371 and are freely movable therein. Coil springs 420 interposed between the flanges 416 and 419 of sleeves 415 and 418, respectively, urge the sleeves 418 into engagement with the crank arms 410. The springs 420 are of greater strength than springs 417.

From the above described structure it will be apparent that upon rotation of the shaft 185 and rotary cam 369, shaft 365 is reciprocated. During the downward movement of shaft 365 pin 378 of block 377 engages the stripping arm 371 and causes downward movement of the same against the tension of spring 375. The sleeves 418 and 415 and shafts 400 are thereby moved downwardly against the tension of the springs 420 and 417, respectively, and the stripping feet 407 are moved from their full line positions, as shown in Fig. 26, to the lowermost dotted line position of this figure. Previous to the above described downward movement of the shafts 400 and stripping feet 407, roller 381 of the block 380 on the upper end of shaft 365 causes a transverse movement of the cam bracket 383 and arcuate plate 388 which effects a partial rotation of the crank arms 410, stripping shafts 400 and stripping feet 407 moving the latter to operative or stripping position, as shown in dotted lines in Fig. 27.

Upon upward movement of the shaft 365 the pin 378 disengages from the stripping arm 371 and the same returns to its uppermost position under the action of spring 375 and shafts 400 and sleeves 415 and 418 are also returned to their normal position, as shown in full lines in Fig. 14, under the influence of springs 417 and 420. The upward movement of shaft 365 and roller 381 causes a transverse movement of the cam bracket 383 and returns the same to its original position, and stripping shafts 400 are thereby rotated in an opposite direction from that described above, and the stripping feet 407 are returned to their original position, as shown in full lines in Fig. 27.

The stripping feet 407 are each provided with an arcuate slot 425 which extends from a countersunk portion 426 toward one side of the foot at which it forms an outwardly converging stem receiving opening 427 (see Fig. 27).

These arcuate slots 425 are designed so as to freely engage the stems of the cherries held between the centering plates 310 and 315 when the stripping feet 407 are moved to their operative or stripping position at which they straddle the stems of the fruits. The stripping position of one stripping foot 407 is shown in dotted lines in Fig. 27.

Positioned between the stripping feet 407 and the centering plate 315 are plates 428 each provided with a strike-off edge 429. The plates 428 are fixed to the centering plates 315 by the screws 318 previously referred to.

An adjustable stop 431 screwed to the supporting bracket 245 in any convenient manner and engaging the arms of the stemming assembly 253 may be provided for limiting the extent of opening of the stemming assemblies 252 and 253.

It has been previously mentioned herein in connection with the description of the automatic feed mechanism that the cherries are placed by the transfer baskets 91 into the fruit holding members or cups 148 of each series of these holding members, and in describing the operation of the stemming mechanism the advancement of one series of these fruit holding members and cherries therein from a position below the automatic feed mechanism B to a position below the stemming mechanism D will be followed.

When the cherries are placed into the fruit holding cups 148 by the transfer baskets 91 with the stems of the fruits in a substantially upright position, the transfer baskets are elevated and assume their original position, as shown in Fig. 3, and during the continuous operation of the machine the table 196 of the turret is now rotated by means of the index mechanism above described. The series of cups under consideration with the cherries positioned therein are advanced from below the automatic feed mechanism B to a position as shown at 435 in Figs. 2 and 10. This is a blank position, and no operations are performed upon the cherries while they are in this position.

The series of fruit holding cups 148 which previously occupied this blank position prior to the above indexing operation of the turret C are now under the stemming mechanism D and in alignment with the stemming assemblies thereof. The stemming mechanism D now performs a complete stemming operation; however, in view of the fact that these cups are empty at the beginning of the operation of the machine, this stemming operation will not be described. At the end of the stemming operation preceding the entry of the cups 148 from the position 435 to a position below the stemming mechanism D, the stemming assemblies 252 and 253 are in their lowermost and open position, and the stripping feet 407 are in inoperative position. The index mechanism of the turret C is again operated, the table 196 of the turret C is rotated, and the cups 148 and the cherries positioned therein are moved from the position 435 to the position 436 (Fig. 13) in which the cups 148 are positioned below the stemming mechanism D.

During the downward movement of the stemming assemblies previous to the last indexing operation of the turret C above referred to, the stripping feet 407 are rotated from their operative to their inoperative position, and upon completion of the downward movement of the stemming assemblies the stemming mechanism D is conditioned for stemming operation and all the parts thereof are in a position as shown in Fig. 13.

Upon rotation of cam 242, after alignment of the cherries below the stemming mechanism and while the turret C is at rest, camway 244 causes upward movement of the roller 243, guide member 239, shaft 238 and supporting bracket 245. This causes a corresponding upward movement of the stemming assemblies 252 and 253 from the position shown in Fig. 13 to the position shown in full lines in Fig. 14.

Incident to the upward movement of the stemming assemblies 252 and 253, roller 284 travels from the valley portion 308 of cam 242 to the hill portion 307 during rotation of said cam. The locking arm 282 is thereby rocked with its pivot 283 rotating in the bracket 281 and urged against the tension of the spring 286 and the locking block 289 is thereby moved from the dotted line position to the full line position of Fig. 15, so that the same will now be within the path of the roller 301, which engages, during the upward movement of the stemming assemblies above referred to, the inclined cam surface 299 of the locking block 289. While the roller rides along this inclined cam surface the stemming assemblies 252 and 253 are closed against the tension of the spring 265 and the stripping shafts 400 and their associated parts, which are carried by the stemming assemblies 253, are shifted along the arcuate plate 388 and stripping plate 371 from their position in Fig. 13 to their full line position in Fig. 14. Finally, the roller 301 engages the straight cam surface 300 of the locking block 289 and the stemming assemblies are held in closed position (see Fig. 14).

Figure 24:
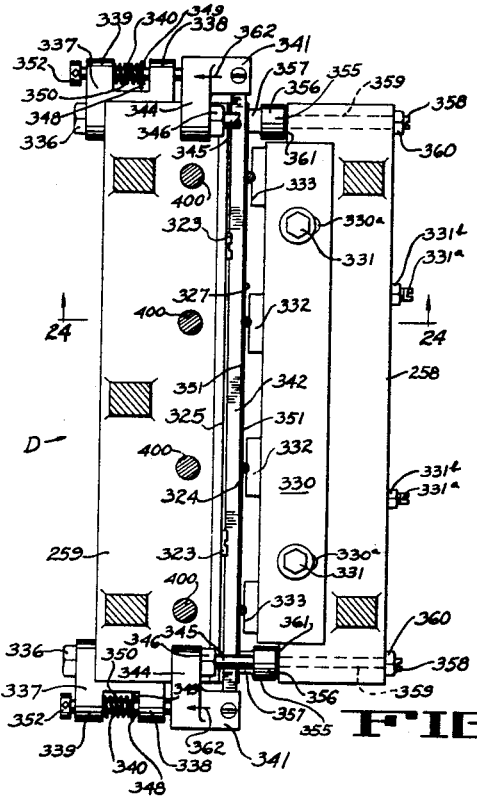
Fig. 24 shows a vertical section of the stemming assemblies taken along lines 24—24 of Fig. 23.
Figure 22:
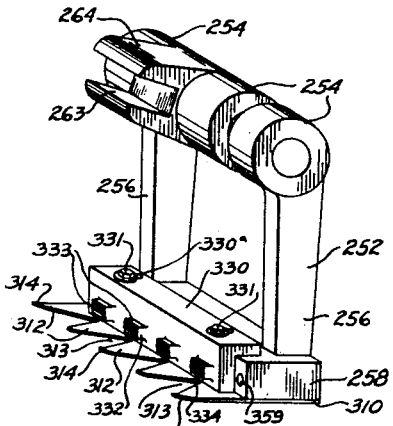

While the stemming assemblies move to closed and upward position, the centering plates 310 and 315 thereof move toward each other, and the centering fingers 312 and 316 of opposing centering plates straddle the stems of the cherries and guide the same into the apex portions of the V-slots 313 and 317 of the centering plates 310 and 315, respectively, in a manner as clearly illustrated in Figs. 18, 19 and 24. This rights the stems of the cherries and centers the same, so that the axes of the stems of the fruits are now in substantial alignment with the vertical axes of the fruit holding cups 148 within which the cherries are positioned.

When the jaws 258 and 259 of the stemming assemblies 252 and 253 are in their closed position, the corrugated stem gripping faces 333 and 327 grip the stems of the cherries intermediate the fruits and the free ends of the stems, and while the stemming assemblies continue their upward movement the cherries are lifted out of the cups and are held suspended from the stemming assemblies above the cups 148 of the turret C in a manner as will be best seen from Figs. 14 and 20.

It should be noted that when the stemming assemblies close, the stop lugs 351 engage the abutment faces 328 of the stem gripping member 324 and the corrugated gripping faces 327 and 333 are held in a slightly spaced relation with respect to each other so that the stems of the cherries are firmly gripped thereby but are not broken or pinched off. Furthermore, the stop lugs 356 of the stemming assembly 252 engage the stop pins 345 of the stemming assembly 253 and shift the blocks 341 and strike-off bars 342 in a backward direction against the tension of the springs 350, so that the front edges 351 of the strike-off bars are retracted behind the corrugated stem gripping face 327.

All of the above mentioned operations, namely, the closing of the stemming assemblies, the righting and centering of the stems of the cherries, the gripping of the stems of the cherries, and the raising of the fruits out of the cups to the position as shown in full lines in Fig. 14 take place during the upward movement of the stemming assemblies above referred to.

During the upward movement of the stemming assemblies, but after closing of the same, the roller 381 of the block 380, as well as the pin 378 of block 377 and the vertical shaft 365, travel in a downward direction while roller 367 of the rotary cam 369 rides along hill portion 368a of camway 368. The roller 381 travels downwardly within the camway 382 and shifts the arcuate plate 388 in a transverse direction, as indicated by an arrow 438 to the position as shown in Fig. 16. This transverse movement of the arcuate plate 388 causes a cranking movement of crank pins 411 and crank arms 410, effecting a partial rotation of the stripping shafts 400, and causing movement of the stripping feet 407 from their inoperative position shown in full lines in Fig. 27 to their operative position as shown in dotted lines in Fig. 27 and in full lines in Figs. 14 and 20. The stems of the cherries are received within the arcuate slots 425 and the stripping feet straddle the stems of the fruits, which are now positioned at the ends of the arcuate slots 425 in the center of the spherical recesses or countersunk portions 426. During the cranking operation above described, the crank pins 411 rotate freely within the guide blocks 412.

Upon completion of the movement of the stripping feet 407 to their operative or stripping position, as shown in dotted lines in Fig. 27, and in full lines in Figs. 14 and 20, the stemming assemblies have reached their uppermost position, as shown in Fig. 14, in which they remain for a short interval during which the stripping operation described hereafter takes place.

While the stemming assemblies remain in their uppermost position with the cherries held by their stems suspended therefrom, the vertical shaft 365 continues to move in a downward direction but at an accelerated speed, pin 378 engages the stripping arm 371 and moves the same rapidly from the full line position to the dotted line position of Fig. 14 against the tension of the spring 375. Sleeves 418 on the stripping shafts 400 are moved downwardly against the pressure of springs 420, which, in turn, effect a downward movement of the sleeves 415 and stripping shafts 400 against the tension of the springs 417.

The above described downward movement of the stripping shafts 400 causes a corresponding downward movement of the stripping feet 407, which engage the stem ends of the cherries to tauten the stems, strip the fruits from their stems, and snap the cherries back into the supporting cups 148 in oriented position for the pitting operation to follow.

In further explanation of the above mentioned stripping of the cherries from the stems, it is to be noted that during the downward movement of the stripping feet 407 the cherries are held in suspended position on the stemming assemblies 252 and 253 with the stems firmly grasped by the corrugated gripping faces 333 and 327 of the gripping members 324 and 332. It should, therefore, be observed that while the stripping feet 407 move downwardly and engage the stem ends of the fruits, the stems of the same are tensioned and straightened and the axes of the stem portions intermediate the corrugated gripping faces 327, 333 and the stem end portions of the fruits are brought into accurate axial alignment with the vertical axes of the fruit holding cups 148.

Furthermore, during the downward movement of the stripping feet 407 the stem end portions of the cherries are engaged by the lower side of the stripping feet 407 adjacent the recess 426, so that the fruits are oriented or righted and tilted into proper axial alignment with the fruit holding cups 148. Thereupon, the downward pressure of the stemming feet 407 under the actuation of the stripping plate 371 and compression of the springs 420 will increase to such an extent that the cherries are stripped from their stems.

Certain cherries are very hard to strip from the stems and if the pressure created by the compression of the spring 420 is not sufficient the flanges 419 of the sleeves 418 will engage the upper end of the sleeves 415 fixed to the shafts 400, and the stripping shafts and stripping feet 407 will be positively forced to their lowermost position, assuring a proper stripping of the fruits.

During the stripping operation, while the cherries are pulled from the stems, the meat in the vicinity of the stem end portions of the cherries adjacent the roots of the stems is raised (see Fig. 25), and enters into the spherical recesses or countersunk portions 426 of the stripping feet 407, so that the stems may be freely pulled from the fruits before the meat of the cherries in the vicinity of the stem ends thereof encounters any resistance to such upward movement during the stripping operation. This facilitates materially the extraction of the stems and prevents the breaking of the same.

In the above, it has been stated that the stripped cherries are snapped back into the fruit supporting cups 148 in proper centered relation with respect thereto. This transfer movement of the cherries from the stemming assemblies back into the cups takes place very rapidly and ahead of the free gravitative fall of the fruits, so that the same have no chance to become disaligned with respect to the fruit supporting cups.

Upon completion of the stripping operation and further rotation of the rotary cam 369, the vertical shaft 365 is immediately shifted in an upward direction. Pin 378 disengages from the stripping plate 371 which returns rapidly to its original position, as shown in full lines in Fig. 14, under the influence of spring 375. Likewise, stripping shafts 400 and their associated parts, including the stripping feet 407, move suddenly to their uppermost positions under the influence of the springs 420 and 417, and the stems held between the corrugated gripping faces 327 and 333 enter into the arcuate slots 426 of the stripping feet 407. However, quite frequently the stems will not enter these slots and their lowermost ends previously attached to the cherries will engage the upper surface of the returning stripping feet 407 and will be clamped between the stripping feet and the lower side of the centering plate 415 of the stemming assembly 253 in a manner as shown in full lines in Fig. 26.

During the upward movement of the stripping shafts 400 and their associated parts, the stripping shafts 400 and the crank pins 411 slide freely within the sleeves 418 and guide blocks 412, respectively, as will be obvious from the construction of the stemming mechanism described hereinbefore.

During the further operation of the machine the roller 284 (see Fig. 15) disengages from the hill portion 307 of the peripheral cam surface 285 of the rotary cam 242 and the rocking arm 282 is rocked around its pivot 283 under the action of spring 286, so that the locking block 289 is moved from its full line to its dotted line position, as shown in Fig. 15, and disengages from the roller 301.

The stemming assemblies which remain during this operation of the rocking arm 282 in their uppermost position are immediately swung to open position when the locking block 289 disengages from the roller 301. This opening movement is effected by the spring 265 previously referred to. While the stemming assemblies open, the stems, which are held within the V slots 317 of the centering plate 315 and in contact with the gripping face 327 by means of the stripping feet 407 (which are still in their operative position) are disengaged from the corrugated gripping faces 333 of the stemming assembly 252.

While the stemming assemblies open and the corrugated gripping faces 327 and 333 move away from each other, stop pins 345 of the stemming assembly 253 disengage from the stop lugs 356 of the stemming assembly 252. The strike-off bars 342 are moved forward under the action of the springs 350, so that the front edges 351 thereof project beyond the corrugated gripping face 327. The stems of the cherries, which may stick or adhere to the gripping face 327, are thereby dislodged from the same.

With the stemming assemblies now in their open position, further rotation of cam 242 causes downward movement of shaft 238, supporting bracket 245 and the stemming assemblies 252 and 253 and their associated parts to the position shown in Fig. 13.

During this downward movement of the stemming assemblies and further upward movement of the vertical shaft 365 effected by the rotary cam 369, the roller 381 enters the inclined camway portion of the camway 382 of the cam bracket 383 and causes a transverse movement of the arcuate plate 388 in a direction opposite to that shown by arrow 438 in Fig. 16. This movement of the arcuate plate will exert a cranking action upon the crank pins 411 and crank arms 410 and the stripping shafts 400 are rotated in an opposite direction from that previously described, and the stripping feet 407 are moved from operative to inoperative position, i. e., from the dotted line position to the full line position, as illustrated in Fig. 27.

While the stripping feet 407 return to their inoperative position, the stems projecting through the arcuate slots 425 are released and discharged from the stemming assembly 253. The stems, which have been clamped between the stripping feet 407 and the lower side of the centering plate 315, are shifted along with the stripping feet 407 against the strike-off edge 429 of the plates 428 and are forced out of engagement with the stripping feet while the same return to their inoperative position. This releases these stems from the stemming assembly 253 and the same drop downwardly into a chute, not shown, and are discharged from the machine.

While the stemming assemblies are open and in their lowermost position, as shown in Fig. 13, the indexing mechanism of the turret C effects another indexing operation of the table 196, and the stemmed cherries which are properly centered within the fruit holding cups 148 move from the position 436, as shown in Fig. 14, in which they are below the stemming mechanism D, to the position 439, as shown in Fig. 1 in which they are below the pitting mechanism E. Thereupon, the cycle of operation of the entire stemming mechanism repeats in regard to the next row of cherries presented thereto in the same manner as above described.

*Operation*

In the above description of the construction of the machine the operation of the various parts thereof has been specifically explained. However, for a more complete understanding a résumé of the entire cycle of operation of the machine will now be given wherein the function of the various units will be set forth in proper sequence and timed relation.

It has been stated hereinbefore that the entire mechanism of the machine is operated from a single source of power and it will therefore be noted that upon operation of the motor 30 shafts 20, 176, 182, 185, 186 and 190 are continuously driven at predetermined speeds so as to effect the operation of the feed conveyor A, automatic feed mechanism B, the turret C, and the stemming, pitting, reshaping and ejector mechanisms D, E, F, and G respectively, in timed relation with respect to each other. The shafts 20, 176, 182, 185, 186, and 190 are driven in the directions as indicated by arrows in the various views.

The shaft 186 operates the index mechanism and causes intermittent rotation of the turret C, so that the series of cups 148 are advanced in intermittent motion past the various fruit handling devices above referred to.

In describing the cycle of operation of the machine, the travel of a single row of fruits from the feed conveyor A to the ejector mechanism G will be followed. It should be understood, however, that in the actual operation of the machine successive rows of fruit are supplied to the machine, which travel in successive order from the automatic feed mechanism past the stemming, pitting and reshaping mechanisms to the ejector mechanism, which discharges the finished fruits from the machine. The cycle of operation repeats, therefore, with respect to each row of fruits passing through the machine in the same manner as herein described.

Beginning now with the cycle of operation of the machine, it will be noted that the rotation of shaft 20 causes a continuous operation of the feed conveyor A and the fruit receiving buckets 16 thereof supply successive rows of fruits to the chutes 40 of the automatic feed mechanism of the machine in predetermined intervals.

When a row of fruits is discharged from the feed conveyor A into the chutes 40 of the automatic feed mechanism B the parts of the latter are in a position as shown in Fig. 1. The discharge openings of the chutes 40 are closed by the control gates 50 and the cherries drop upon the inclined surface 50a of the same and roll downwardly along the latter so as to arrange themselves with the stems protruding from the chutes 40 substantially in a manner as shown in Figs. 1 and 9.

Thereupon the transfer baskets 65 are raised and their sections 92 and 93 are moved to closed position (see Fig. 9). The control gates 50 are swung to open position and the cherries are dropped into the transfer baskets 91. While the cherries fall through the righting members 90a they are righted so that their stems point in upward directions.

Incident to the transfer of the cherries from the chutes 40 to the transfer baskets 91 while the latter remain in their uppermost position, the indexing mechanism 201 rotates the turret C and series of fruit holding cups designated 575 in Fig. 10 is moved from its alignment with the ejector mechanism G into alignment with the automatic feed mechanism B.

Thereupon, the transfer baskets 91 are lowered and subsequently opened and the cherries are placed in righted position into the cups 148 of the series of cups 575 under consideration.

While the transfer baskets move downwardly the control gates 50 move to closed position and the next row of cherries is discharged from the feed conveyor A into the chutes 40 and the cycle of the automatic feed mechanism repeats in the same manner as stated above.

Thereupon the index mechanism 201 effects another rotation of the turret C and the series of fruit holding cups 575 is advanced from below the automatic feed mechanism to the position 435 (see Fig. 10). This is a blank position intermediate the automatic feed mechanism B and the stemming mechanism D and no operations are performed upon the cherries in this position.

The next indexing operation of the index mechanism 201 causes further rotation of the turret C and places the series of fruit holding cups 575 below the stemming mechanism D and into proper alignment therewith.

Previous to the commencement of the last indexing operation above described the stemming assemblies 252 and 253 of the stemming mechanism D are open and in their lowermost position (see Fig. 13).

Upon completion of the last indexing operation while the series of fruit holding cups are at rest below the stemming mechanism D and in alignment therewith the stemming assemblies are closed and raised. While the stemming assemblies close and raise, the centering plates 310 and 315 center the stems of the cherries and the gripping faces 327 and 333 grip the stems of the fruits, so that the cherries are lifted from the cups.

Incident to the raising of the stemming assemblies and subsequent to the centering and gripping of the stems the stripping feet 407 are moved to operative position, as shown in Fig. 20 and in dotted lines in Fig. 27. When the stemming assemblies reach their uppermost position the stripping feet move downward, engage the stem ends of the fruits, center the same, strip the cherries from the stem and return the fruits in centered or oriented position into the cups (see Fig. 15). The stripping feet 407 return immediately to their uppermost position but remain in their operative position straddling the stems of the fruits. Thereupon the stemming assemblies are swung to open position, the stems are dislodged from the gripping faces 327 and 333 but are held on the stemming assembly 253 by the stripping feet.

The open stemming assemblies are now moved to their lowermost position and incident to their downward travel the stripping feet are returned to their original or inoperative position and the stems are discharged from the stemming assembly 253.

When the stemming assemblies reach their lowermost position, the turret C is operated by the index mechanism 201 and the series of fruit holding cups 575 and the centered and stemmed fruit are now advanced from the stemming mechanism D to the pitting mechanism E and the cherries are brought into proper alignment therewith.

It will be noted that the stemmed cherries arrive beneath the pitting mechanism, stem end up, in readiness to receive pitting tools thereof along their stem-blossom axis. Thereafter the fruit with pits removed are advanced by the turret C and indexing mechanism into proper alignment with the reshaping mechanism F which closes the wounds left in the fruit by the removal of the pits thus reshaping the fruit; thereafter the turret C is indexed to its next position in alignment with the ejector mechanism G where the pitted and reshaped fruit is ejected from the fruit holding cups. The row of cups 575 thus emptied is then ready to receive a new group of unstemmed cherries from the automatic feed mechanism B when the turret C is again advanced by the indexing mechanism. Each cycle of operation of the machine is repeated in regard to each new group of unstemmed fruit in the same manner as hereinbefore stated.

While I have described a particular embodiment of the present invention, it will be understood that various changes and modifications may be made without departing from the spirit of the present invention and the scope of the appended claims.

Having thus described my invention and in what manner the same may be used, what I claim as new and desire to protect by Letters Patent is:

1. In a fruit handling machine, means for holding the fruit to be pitted, means for lifting the fruit from the holding means and for suspending the fruit above the same, and means for centering the suspended fruit with respect to the holding means and for returning the centered fruit thereto.

2. A fruit stemming mechanism comprising fruit holding means, means for gripping the stem of the fruit presented thereto by the holding means, means for raising the gripping means with respect to the holding means for lifting the fruit from the latter, and means movable relative to the gripping means for engaging the suspended fruit and for stripping the same from the stem.

3. A fruit stemming mechanism comprising fruit holding means, means for gripping the stem of the fruit presented thereto by the holding means, means for raising the gripping means with respect to the holding means for lifting the fruit from the latter, and means movable relative to the gripping means for stripping the fruit from the stem and for returning the same to said holding means.

4. A stemming mechanism for fruit pitting machines comprising means for gripping the stem of the fruit and for holding said fruit by its stem in suspended position, means for engaging the fruit suspended from the stem gripping means and for stripping the same from the stem, and means for aligning the stem of the fruit with respect to said gripping means previous to the operation of the same.

5. A stemming mechanism for fruit pitting machines comprising means for gripping the stem of the fruit, means for engaging the stem end of the fruit for moving the fruit relative to the gripping means and for stripping the fruit from the stem, and means carried by the gripping means and operable thereby for laterally and transversely aligning the stem of the fruit with respect to the engaging means previous to the gripping of the stem by said gripping means.

6. A stemming mechanism for fruit pitting machines comprising means for gripping the stem of the fruit, means carried by the stem gripping means for aligning the stem of the fruit with respect to said gripping means incident to the gripping action thereof, and means movably mounted on said gripping means and cooperating therewith for stripping the fruit from the stem.

7. A stemming mechanism for fruit pitting machines comprising stem gripping means, means for operating said stem gripping means for gripping the stem of the fruit presented thereto, centering means associated with the stem gripping means for aligning the stem of the fruit with respect to said gripping means incident to the operation of the same, stripping means associated with the gripping means, and means for actuating the stripping means for engaging the fruit and for stripping the same from the stem.

8. A stemming mechanism for fruit pitting machines comprising cooperating jaws, means for closing the jaws for gripping the stem of a fruit presented thereto, centering means associated with the jaws for aligning the stem of the fruit with respect to the jaws during closing of the same, stripping means associated with the jaws, and means for actuating the stripping means for engaging fruit and for stripping the same from the stem held by said jaws.

9. A stemming mechanism for fruit pitting machines comprising cooperating jaws, means for closing the jaws for gripping the stem of the fruit presented thereto, means associated with the jaws and simultaneously operable therewith for aligning the stem of the fruit with respect to the jaws during closing of the same, stripping means associated with one of the jaws, means for moving said stripping means into operative position, and means for actuating the stripping means for engaging the fruit and for forcing the same from the stem.

10. A stemming mechanism for fruit pitting machines comprising stem gripping means, means for closing the stem gripping means for gripping the stem of a fruit presented thereto, means operable with the stem gripping means for laterally and transversely aligning the stem of the fruit with respect to the gripping means incident to closing of the same, means associated with the gripping means for stemming the fruit held thereby and for holding the severed stem on said gripping means, means for opening the gripping means subsequent to stemming of the fruit and means for moving the stemming means relative to the gripping means for releasing the stem after said gripping means assumes opened condition.

11. A stemming mechanism for fruit pitting machines comprising stem gripping means, means for closing the stem gripping means for gripping the stem of a fruit presented thereto, means associated with the stem gripping means for aligning the stem of the fruit with respect to the gripping means incident to closing of the same, means associated with the gripping means for stemming the fruit held thereby and for holding the stem on said gripping means, means for opening the gripping means subsequent to stemming of the fruit, and means operable upon opening of the gripping means for releasing the hold of the stemming means on the stem and for discharging the stem from said gripping means.

12. A fruit stemming mechanism comprising fruit holding means, stem gripping means for gripping the stem of fruit presented thereto by the holding means and for lifting the fruit from said holding means, centering means associated with the stem gripping means for aligning the stem of the fruit with respect to the holding means incident to the operation of the gripping means, and means for stripping the fruit from the stem held by the gripping means and for returning the stemmed fruit to said holding means.

13. A fruit stemming and orienting mechanism comprising fruit holding means, stem gripping means, means for operating the stem gripping means for gripping the stem of fruit presented thereto by the holding means, means for raising said gripping means with respect to the holding means for lifting the fruit from said holding means, means for centering the stem relative to said holding means upon operation of the gripping means, and means for stripping the fruit from the stem held by the gripping means for returning the stemmed fruit to the holding means and for orienting the fruit with respect to the holding means incident to the stripping of the fruit from the stem.

14. A fruit stemming mechanism comprising fruit holding means, cooperating stemming assemblies pivotally mounted above the fruit holding means, means for closing the stemming assemblies for gripping the stem of a fruit presented thereto by the holding means, means for raising the stemming assemblies with respect to the holding means for lifting the fruit therefrom, and means for actuating the stemming assemblies for stripping the fruit from the stem and for returning the fruit into said holding means.

15. A fruit stemming mechanism comprising fruit holding means, cooperating stemming assemblies mounted adjacent the holding means, said stemming assemblies having stem gripping and fruit stripping means, means for actuating the stem gripping means for gripping the stem of a fruit presented thereto by the holding means, means for raising the stemming assemblies for lifting the fruit above the holding means, and means for actuating the stripping means for removing the fruit from the stem and for returning the fruit into said holding means.

16. A fruit stemming and orienting mechanism comprising fruit holding means, cooperating stemming assemblies mounted adjacent the holding means, said stemming assemblies having stem gripping and fruit stripping means, means for actuating the stem gripping means for gripping the stem of a fruit presented thereto by the holding means, means for raising the stemming assemblies for lifting the fruit from the holding means, and means for actuating the stripping means for removing the fruit from the stem and for returning the fruit into said holding means in predetermined relation with respect thereto.

17. A stemming device for fruit pitting machines comprising pivotally arranged gripping jaws, centering means fixed on said jaws, stripping means slidably and rotatably mounted on one of said jaws, and means for effecting pivotal movement of said jaws.

18. A stemming device for fruit pitting machines comprising pivotally arranged gripping jaws, stem discharging means on one of said jaws, centering means fixed on said jaws, stripping means slidably and rotatably mounted on one of said jaws, and means for restricting the pivotal movement of the jaws.

19. A stemming device for fruit pitting machines comprising pivotally arranged gripping jaws, stem discharging means on one of said jaws, resilient means for operating the stem discharge means upon opening and closing of said jaws, centering means fixed on said jaws, and stripping means slidably and rotatably mounted on one of said jaws.

20. A stemming device for fruit pitting machines comprising pivotally arranged gripping jaws, corrugated stem gripping faces on said jaws, centering means fixed on said jaws, and stripping means slidably and rotatably mounted on one of said jaws.

21. A stemming device for fruit pitting machines comprising pivotally arranged gripping jaws, cooperating serrated centering plates on said jaws, stripping means slidably and rotatably mounted on one of said jaws, means for moving said jaws to open and closed position, and means on said jaws for restricting the closing movement thereof.

22. In a fruit stemming and orienting mechanism embodying a fruit holder: means engageable with the stem of a fruit disposed in said holder to remove the fruit from the holder, and means engageable with the body of the fruit to strip it from the stem and return it to the holder, thereby orienting the fruit body as the stem is straightened out in the stripping process so that said fruit body is returned to the holder in predetermined position.

23. In a fruit stemming and orienting mechanism embodying a fruit holder: a pair of clamping jaws arranged to receive the stem of a fruit disposed in said holder, means for closing said jaws to grasp said stem, means for moving the closed jaws away from the holder to remove the fruit from the holder, a stripper foot cooperatively associated with said jaws, and means for actuating said stripper foot to strip the body of the fruit from its stem and return it to the holder, thereby orienting the fruit body as the stem is straightened out in the stripping process so that said fruit body is returned to the holder in predetermined position.

24. A stemming mechanism for fruit pitting machines comprising means for holding the fruit, means operable in timed relation with said holding means for feeding stem bearing fruit to said holding means with the stem of the fruit positioned in a predetermined general direction, means for shifting the stem of the fruit to a position concentric to the fruit holding means, means movable with the stem shifting means for gripping the positioned stem and for lifting the fruit by its stem from the fruit holding means, and means carried by said gripping means and movable relative thereto for stripping the fruit from the stem and orienting the fruit with respect to the holding means and for returning the fruit to said holding means in said oriented condition.

25. A stemming mechanism for fruit pitting machines comprising a fruit support adapted to receive stem bearing fruit with the stem extending in a predetermined general direction, means for gripping the stem of the fruit and for lifting the latter relative to the fruit support, means arranged on the gripping means for movement therewith for laterally and transversely aligning the stem of the fruit with respect to the gripping means incident to the gripping action thereof, and means carried by said gripping means and movable relative thereto for simultaneously stripping the fruit from the stem and for orienting the fruit with respect to the fruit support and for returning the fruit to said fruit support in said oriented condition.

BURTON C. COONS.